United States Patent
Ryu et al.

(10) Patent No.: US 11,956,653 B2
(45) Date of Patent: Apr. 9, 2024

(54) CHANNEL RATIO METRICS FOR BEAMFORMED COMMUNICATION

(71) Applicant: QUALCOMM Incorporated, San Diego, CA (US)

(72) Inventors: Jung Ho Ryu, Fort Lee, NJ (US); Sony Akkarakaran, Poway, CA (US); Junyi Li, Fairless Hills, PA (US); Tao Luo, San Diego, CA (US); Arumugam Chendamarai Kannan, San Diego, CA (US); Wooseok Nam, San Diego, CA (US); Hua Wang, Basking Ridge, NJ (US); Jelena Damnjanovic, Del Mar, CA (US); Juan Montojo, San Diego, CA (US); Xiaoxia Zhang, San Diego, CA (US); Piyush Gupta, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 333 days.

(21) Appl. No.: 17/347,124

(22) Filed: Jun. 14, 2021

(65) Prior Publication Data
US 2022/0400395 A1 Dec. 15, 2022

(51) Int. Cl.
*H04W 24/08* (2009.01)
*H04B 17/318* (2015.01)

(52) U.S. Cl.
CPC .......... *H04W 24/08* (2013.01); *H04B 17/318* (2015.01)

(58) Field of Classification Search
CPC .. H04B 7/0404; H04B 7/0408; H04B 7/0608; H04B 7/061; H04B 7/0695; H04B 7/06952; H04B 7/0697; H04W 24/02
See application file for complete search history.

(56) References Cited

U.S. PATENT DOCUMENTS

| | | |
|---|---|---|
| 10,764,832 B2 | 9/2020 | Comsa et al. |
| 2020/0015298 A1* | 1/2020 | Chae ................ H04B 7/0695 |
| 2020/0037254 A1* | 1/2020 | Comsa .............. H04B 7/0404 |
| 2020/0344776 A1* | 10/2020 | Sen .................. H04B 7/0695 |
| 2020/0404665 A1 | 12/2020 | Ryu et al. |
| 2021/0234575 A1* | 7/2021 | Nilsson ............. H04B 7/0408 |
| 2022/0337304 A1* | 10/2022 | Qiao ................. H04B 7/0695 |

OTHER PUBLICATIONS

International Search Report and Written Opinion—PCT/US2022/072786—ISA/EPO—dated Sep. 20, 2022.

* cited by examiner

*Primary Examiner* — Pao Sinkantarakorn

(74) *Attorney, Agent, or Firm* — Patterson + Sheridan, LLP

(57) ABSTRACT

Certain aspects of the present disclosure provide techniques for determining and using channel ratio metrics for beamformed communication. A method that may be performed by a user equipment (UE) includes selecting a first beam of a plurality of beams for determining one or more channel ratio metrics, determining the one or more channel ratio metrics for the first beam, wherein determining the one or more channel ratio metrics is based, at least in part, on an angular separation between the first beam and one or more neighboring beams of the plurality of beams, and transmitting signaling via the first beam based on the one or more channel ratio metrics.

30 Claims, 15 Drawing Sheets

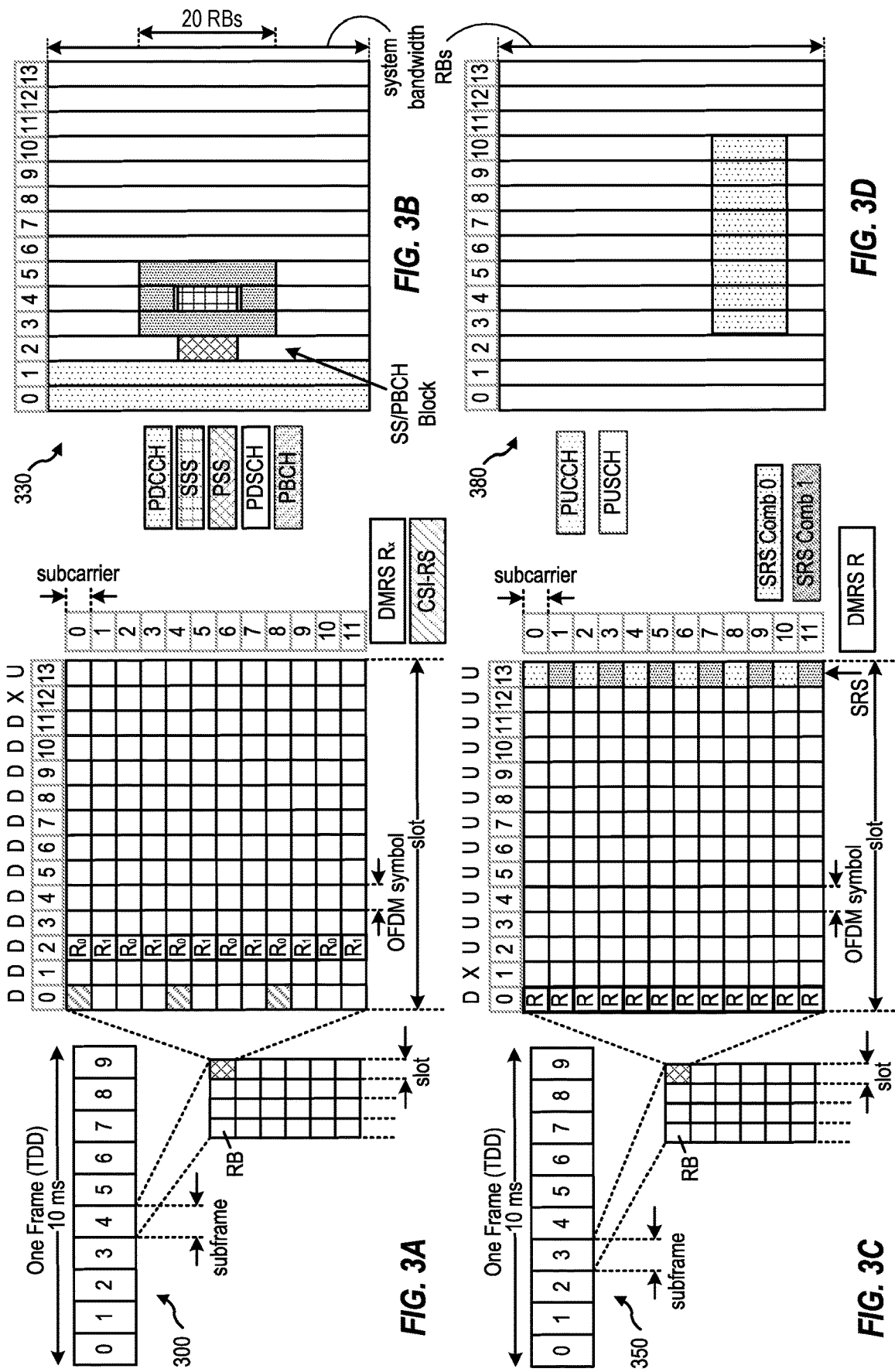

CHANNEL RATIO METRICS FOR BEAMFORMED COMMUNICATION

INTRODUCTION

Aspects of the present disclosure relate to wireless communications, and more particularly, to techniques for determining and using one or more channel ratio metrics for beamformed communication.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

Certain aspects can be implemented in a method for wireless communication performed by a user equipment (UE). The method generally includes selecting a first beam of a plurality of beams for determining one or more channel ratio metrics, determining the one or more channel ratio metrics for the first beam, wherein determining the one or more channel ratio metrics is based, at least in part, on an angular separation between the first beam and one or more neighboring beams of the plurality of beams, and transmitting signaling via the first beam based on the one or more channel ratio metrics.

Certain aspects can be implemented in an apparatus for wireless communication. The apparatus generally includes a memory comprising computer-executable instructions and one or more processors configured to execute the computer-executable instructions and cause the apparatus to: select a first beam of a plurality of beams for determining one or more channel ratio metrics, determine the one or more channel ratio metrics for the first beam, wherein determining the one or more channel ratio metrics is based, at least in part, on an angular separation between the first beam and one or more neighboring beams of the plurality of beams, and transmit signaling via the first beam based on the one or more channel ratio metrics.

Certain aspects can be implemented in an apparatus for wireless communication. The apparatus may include means for selecting a first beam of a plurality of beams for determining one or more channel ratio metrics, means for determining the one or more channel ratio metrics for the first beam, wherein determining the one or more channel ratio metrics is based, at least in part, on an angular separation between the first beam and one or more neighboring beams of the plurality of beams, and means for transmitting signaling via the first beam based on the one or more channel ratio metrics.

Certain aspects can be implemented in a non-transitory computer-readable medium. The non-transitory computer-readable medium may comprise computer-executable instructions that, when executed by one or more processors of an apparatus, cause the apparatus to: select a first beam of a plurality of beams for determining one or more channel ratio metrics, determine the one or more channel ratio metrics for the first beam, wherein determining the one or more channel ratio metrics is based, at least in part, on an angular separation between the first beam and one or more neighboring beams of the plurality of beams, and transmit signaling via the first beam based on the one or more channel ratio metrics.

Certain aspects can be implemented in a computer program product embodied on a computer-readable storage medium. The computer-readable storage medium may comprise code for performing wireless communication by a user equipment (UE) including code for: selecting a first beam of a plurality of beams for determining one or more channel ratio metrics, determining the one or more channel ratio metrics for the first beam, wherein determining the one or more channel ratio metrics is based, at least in part, on an angular separation between the first beam and one or more neighboring beams of the plurality of beams, and transmitting signaling via the first beam based on the one or more channel ratio metrics.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless communication network.

DETAILED DESCRIPTION

Figure 1:
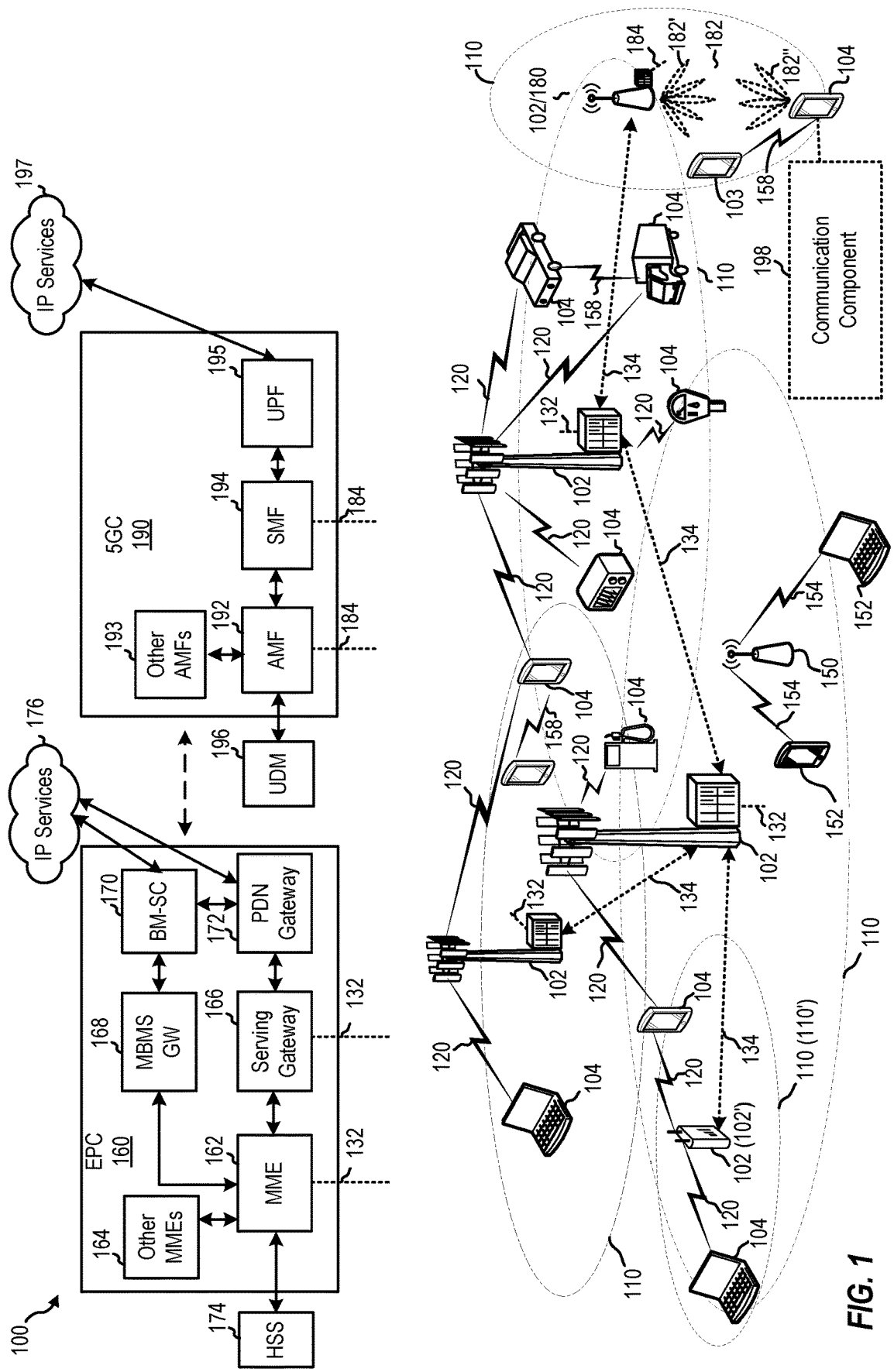
FIG. 1 is a block diagram conceptually illustrating an example wireless communication network.

Aspects of the present disclosure provide apparatuses, methods, processing systems, and computer-readable mediums for determining and using channel ratio metrics for beamformed communication.

In certain wireless communication networks, a wireless channels (e.g., time and frequency resources) may be shared among a plurality of wireless communication devices, such as user equipments (UEs). In some cases, collisions may occur between UEs within the wireless channel. To help avoid these collisions, a technique known as decentralized congestion control (DCC) may be needed to coordinate the usage of the channel. In DCC, all wireless communication devices (e.g., UEs) may cooperate to keep a channel (e.g., as sidelink channel) unsaturated, and resources may be shared among the wireless communication devices equally. In some cases, two metrics may be used to characterize a state of the channel for DCC, such as a channel busy ratio (CBR) and a channel occupancy ratio (CR), which may help control whether a particular UE is able to perform transmissions on the channel. Generally, the CBR metric provides an estimation of the total state of a channel and may be defined as the portion of sub-channels in a resource pool with a received signal strength indicator (RSSI) above a threshold. The CR metric which provides an indication of channel utilization by a UE itself, for example, in terms of a number of sub-channels that are occupied by transmissions by the UE.

Additionally, when communicating in certain wireless communication networks, a UE may communicate using a number of beam via beam forming. In some cases, when transmitting on a beam, most of the transmit energy may propagate in the direction of a main lobe of the beam. However, a small portion of the transmit energy may also propagate in the direction of one or more side lobes of the beam. As a consequence, transmissions on a channel using the beam have the potential to occupy one or more sub-channels in the direction of a neighboring beam and vice versa since the one or more side lobes of the beam may be pointed in a same direction as the other beam.

Thus, transmissions on the beam have the potential to affect the CBR and CR metrics of the neighboring beams and vice versa. However, current definitions of the CBR and CR metrics may not take into account beam forming or transmission beams, which can lead to inaccurate CBR and CR metric determination for a transmission beam. Further, inaccurate CBR and CR metrics may lead to possible interference caused to and by (e.g., to other transmission beams or UEs) the transmission beam.

Accordingly, aspects of the present disclosure provide techniques for determining and using one or more channel ratio metrics for beamformed communication. In some cases, such techniques may involve taking into account neighboring beams when determining the CBR and CR metrics for a particular beam. For example, taking into account CBR and CR metrics of the neighboring beams when determining the CBR and CR metrics of the particular beam may result in more accurate CBR and CR metrics for the particular beam, which reduces the chances of being interfered by the neighboring beams as well as reducing the chances of causing interference to the neighboring beams.

Introduction to Wireless Communication Networks

FIG. 1 depicts an example of a wireless communications network 100, in which aspects described herein may be implemented.

Generally, wireless communications network 100 includes base stations (B Ss) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Figure 9:
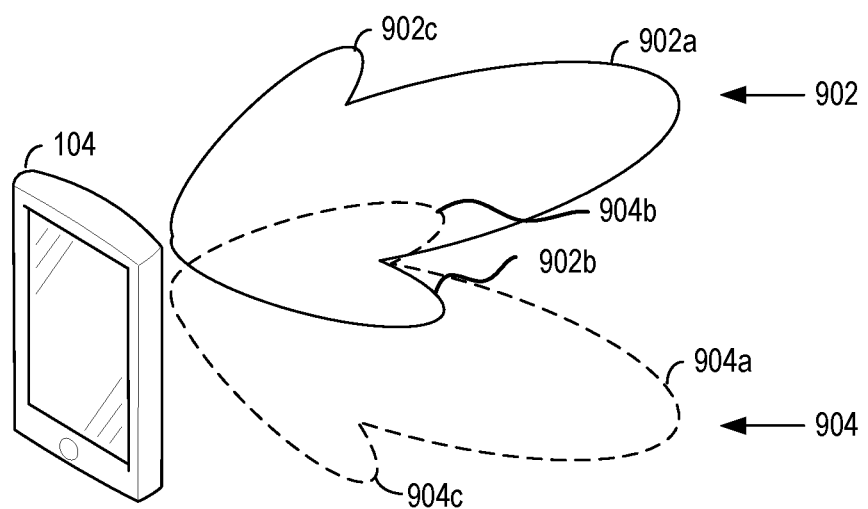
FIG. 9 provides an illustration of the interaction between beams associated with a user equipment.
Figure 13:
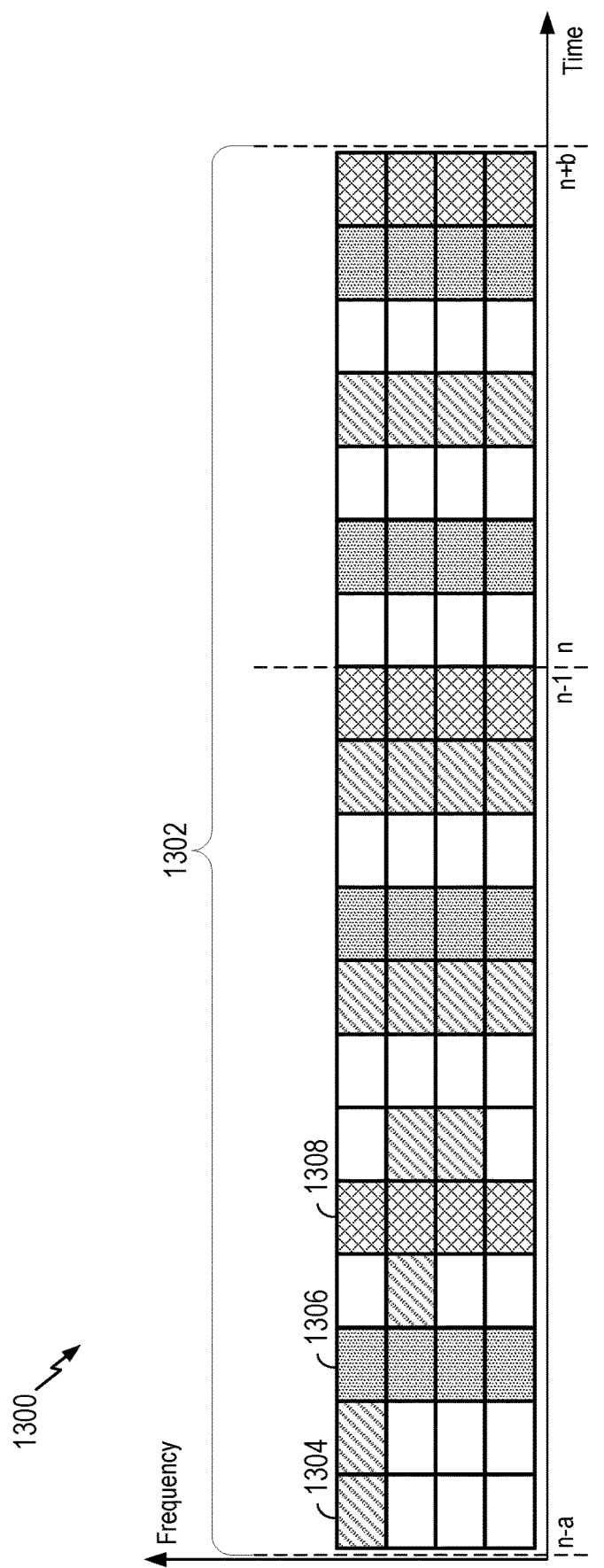
FIG. 13 provides an illustration of a resource pool used to determine a channel occupancy ratio metric.

As shown, the UE 104 in the wireless communication network 100 includes a communication component 198, which may be used configured to perform one or more of the operations illustrated in FIGS. 9 and 13, as well as other operations described herein for determining and using channel ratio metrics for beamformed communication.

Figure 2:
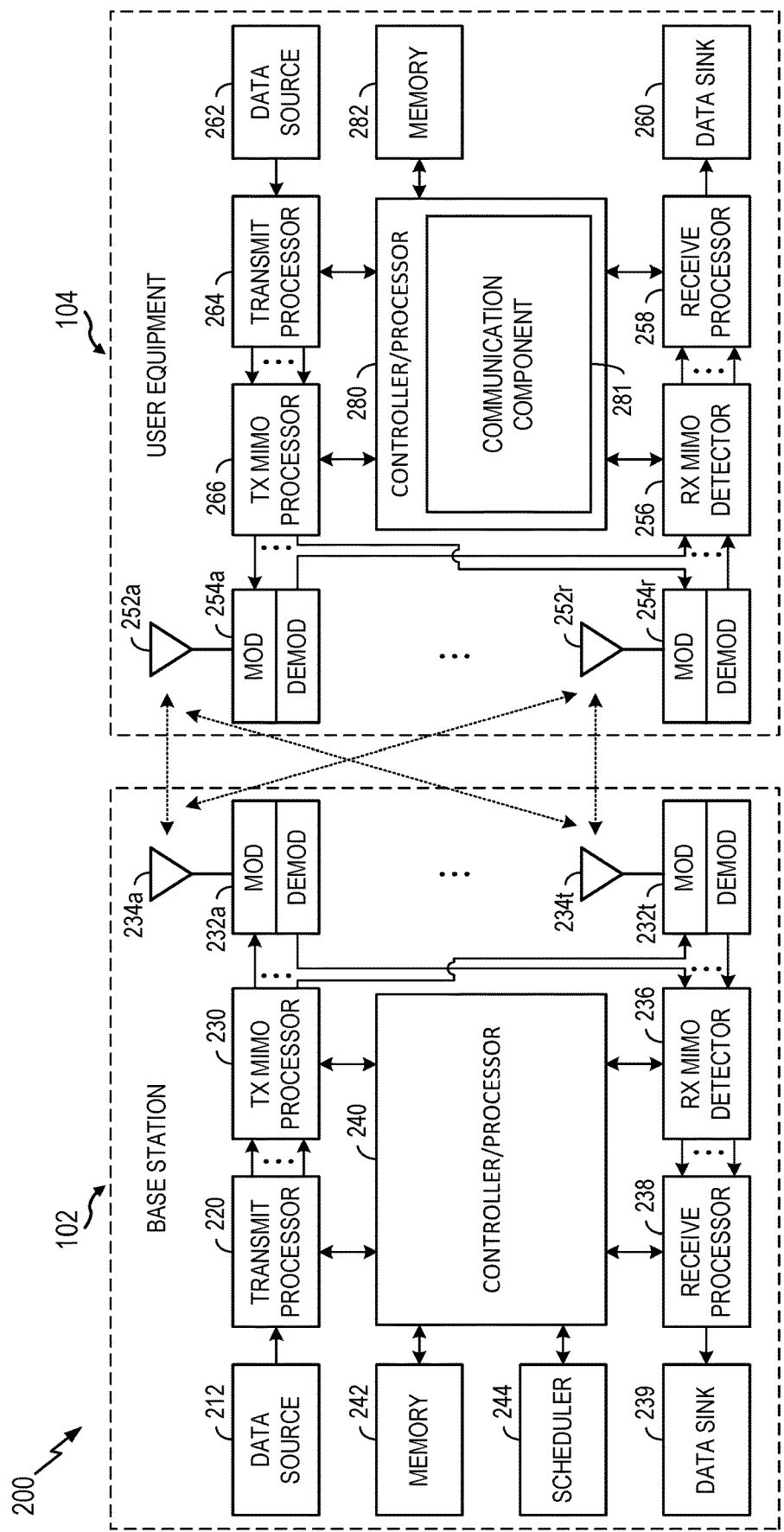
FIG. 2 is a block diagram conceptually illustrating aspects of an example a base station and user equipment.

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., source data 212) and wireless reception of data (e.g., data sink 239). For example, base station 102 may send and receive data between itself and user equipment 104.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., source data 262) and wireless reception of data (e.g., data sink 260).

User equipment 104 includes controller/processor 280, which may be configured to implement various functions related to wireless communications. In the depicted example, controller/processor 280 includes communication component 281, which may be representative of communication component 198 of FIG. 1. Notably, while depicted as an aspect of controller/processor 280, communication component 281 may be implemented additionally or alternatively in various other aspects of user equipment 104 in other implementations.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to mmWave Wireless Communications

In wireless communications, an electromagnetic spectrum is often subdivided, into various classes, bands, channels, or other features. The subdivision is often provided based on wavelength and frequency, where frequency may also be referred to as a carrier, a subcarrier, a frequency channel, a tone, or a subband.

In 5G, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is sometimes referred to (interchangeably) as a "millimeter wave" ("mmW" or "mmWave") band in documents and articles, despite being different from the extremely high frequency (EHF) band (30 GHz-300 GHz), which is identified by the International Telecommunications Union (ITU) as a "millimeter wave" band because wavelengths at these frequencies are between 1 millimeter and 10 millimeters. Radio waves in the band may be referred to as a millimeter wave. Near mmWave may extend down to a frequency of 3 GHz with a wavelength of 100 millimeters. The super high frequency (SHF) band extends between 3 GHz and 30 GHz, also referred to as centimeter wave.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Communications using the mmWave/near mmWave radio frequency band (e.g., 3 GHz-300 GHz) may have higher path loss and a shorter range compared to lower frequency communications. Accordingly, in FIG. 1, mmWave base station 180 may utilize beamforming 182 with the UE 104 to improve path loss and range. To do so, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same. Similar techniques for beamforming using mmWave may also be used for communication between two UEs, such as UE 104 and UE 103 on a device-to-device (D2D) communication link 158, also known as a sidelink, as explained below.

Example Device-to-Device Communication Via Sidelink

In some examples, the communication between the UE 104 and the BS 102 is performed on an access link. The access link may be provided via a Uu interface. Communication between devices, such as between two UEs 104, may be referred to as D2D communication and performed on one or more sidelink channels. In some cases, such D2D communication on the one or more sidelink channels may be performed using the mmWave technology described above.

For example, two or more subordinate entities (e.g., UEs 103 and 104 of FIG. 1) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE 104) to another subordinate entity (e.g., another UE 103) without relaying that communication through the scheduling entity (e.g., UE 104 or BS 102), even though the scheduling entity may be utilized for scheduling and/or control purposes. In some examples, the sidelink signals may be communicated using a licensed spectrum (unlike wireless local area networks, which typically use an unlicensed spectrum). One example of sidelink communication is PC5, for example, as used in V2V, LTE, and/or NR.

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions. The PSFCH may carry feedback such as CSI related to a sidelink channel quality.

Figure 4B:
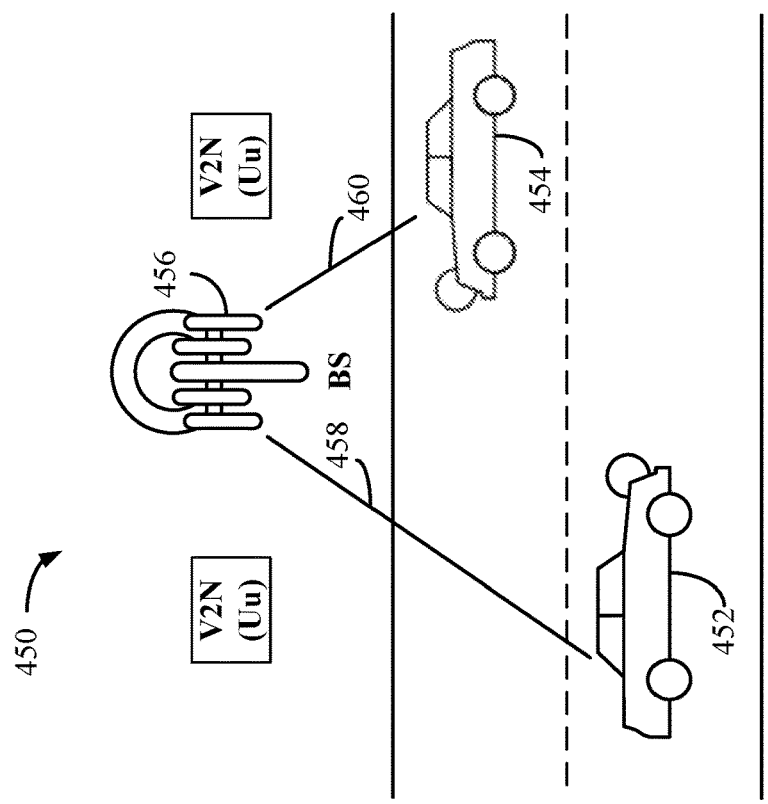
FIG. 4A and FIG. 4B show diagrammatic representations of example vehicle to everything (V2X) systems.
Figure 4A:
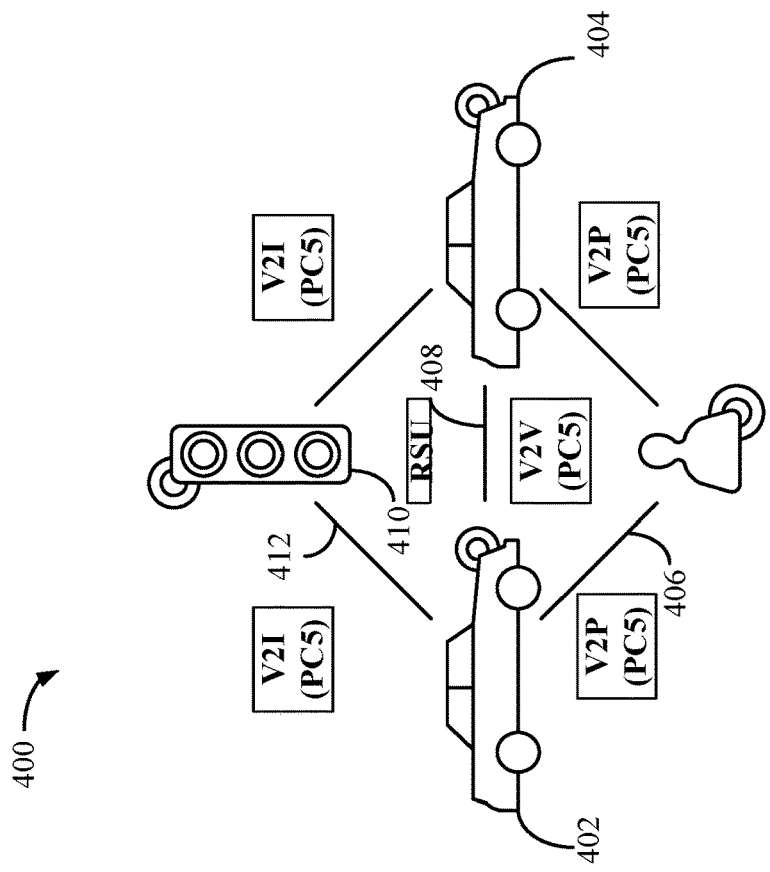

FIG. 4A and FIG. 4B show diagrammatic representations of example vehicle-to-everything (V2X) systems, in accordance with some aspects of the present disclosure. In some cases, the V2X systems may be implemented in the wireless communication network 100 shown in FIG. 1. The V2X systems, provided in FIG. 4A and FIG. 4B provide two complementary transmission modes. A first transmission mode, shown by way of example in FIG. 4A, involves direct communications (for example, also referred to as sidelink communications) between participants in proximity to one another in a local area. A second transmission mode, shown by way of example in FIG. 4B, involves network communications through a network, which may be implemented over a Uu interface (for example, a wireless communication interface between a radio access network (RAN) and a UE).

Referring to FIG. 4A, a V2X system 400 (for example, including vehicle to vehicle (V2V) communications) is illustrated with two vehicles 402, 404. In some cases, the two vehicles 402 and 404 may comprise, for example, UEs 103 and 104, respectively. The first transmission mode allows for direct communication between different participants in a given geographic location. As illustrated, a vehicle can have a wireless communication link 406 with an individual (V2P) (for example, via a UE) through a PC5 interface. Communications between the vehicles 402 and 404 may also occur through a PC5 interface 408. In some cases, such communications between the vehicles 402 and 404 may be performed using beamforming on one or more mmWave frequencies. In a like manner, communication may occur from a vehicle 402 to other highway components (for example, highway component 410), such as a traffic signal or sign (V2I) through a PC5 interface 412. With respect to each communication link illustrated in FIG. 4A, two-way communication may take place between elements, therefore each element may be a transmitter and a receiver of information. The V2X system 400 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 4B shows a V2X system 450 for communication between a vehicle 452 and a vehicle 454 through a network entity 456. In some cases, the vehicles 452 and 454 may comprise, for example, UEs 103 and 104, respectively. These network communications may occur through discrete nodes, such as a BS (e.g., the BS 110a), that sends and receives information to and from (for example, relays information between) vehicles 452, 454. The network communications through vehicle to network (V2N) links 458 and 410 may be used, for example, for long range communications between vehicles, such as for communicating the presence of a car accident a distance ahead along a road or highway. Other types of communications may be sent by the wireless node to vehicles, such as traffic flow conditions, road hazard warnings, environmental/weather reports, and service station availability, among other examples. Such data can be obtained from cloud-based sharing services.

Roadside units (RSUs) may be utilized. An RSU may be used for V2I communications. In some examples, an RSU may act as a forwarding node to extend coverage for a UE. In some examples, an RSU may be co-located with a BS or may be standalone. RSUs can have different classifications. For example, RSUs can be classified into UE-type RSUs and Micro NodeB-type RSUs. Micro NB-type RSUs have similar functionality as the Macro eNB/gNB. The Micro NB-type RSUs can utilize the Uu interface. UE-type RSUs can be used for meeting tight quality-of-service (QoS) requirements by minimizing collisions and improving reliability. UE-type RSUs may use centralized resource allocation mechanisms to allow for efficient resource utilization. Critical information (e.g., such as traffic conditions, weather conditions, congestion statistics, sensor data, etc.) can be broadcast to UEs in the coverage area. Relays can re-broadcasts critical information received from some UEs. UE-type RSUs may be a reliable synchronization source.

Example Sidelink Resource Mapping

When communicating on a sidelink a UE may use resources selected from a resource pool. The resource pool may be defined as a consecutive number of resource blocks (RBs) in the frequency domain in units of sub-channels. In other words, a resource pool may be composed of a plurality of consecutive RBs in frequency. In particular, a sub-channel may be defined as one or more of the RBs (e.g., that are consecutive), and a resource pool may be defined as one or more sub-channels.

Figure 5:
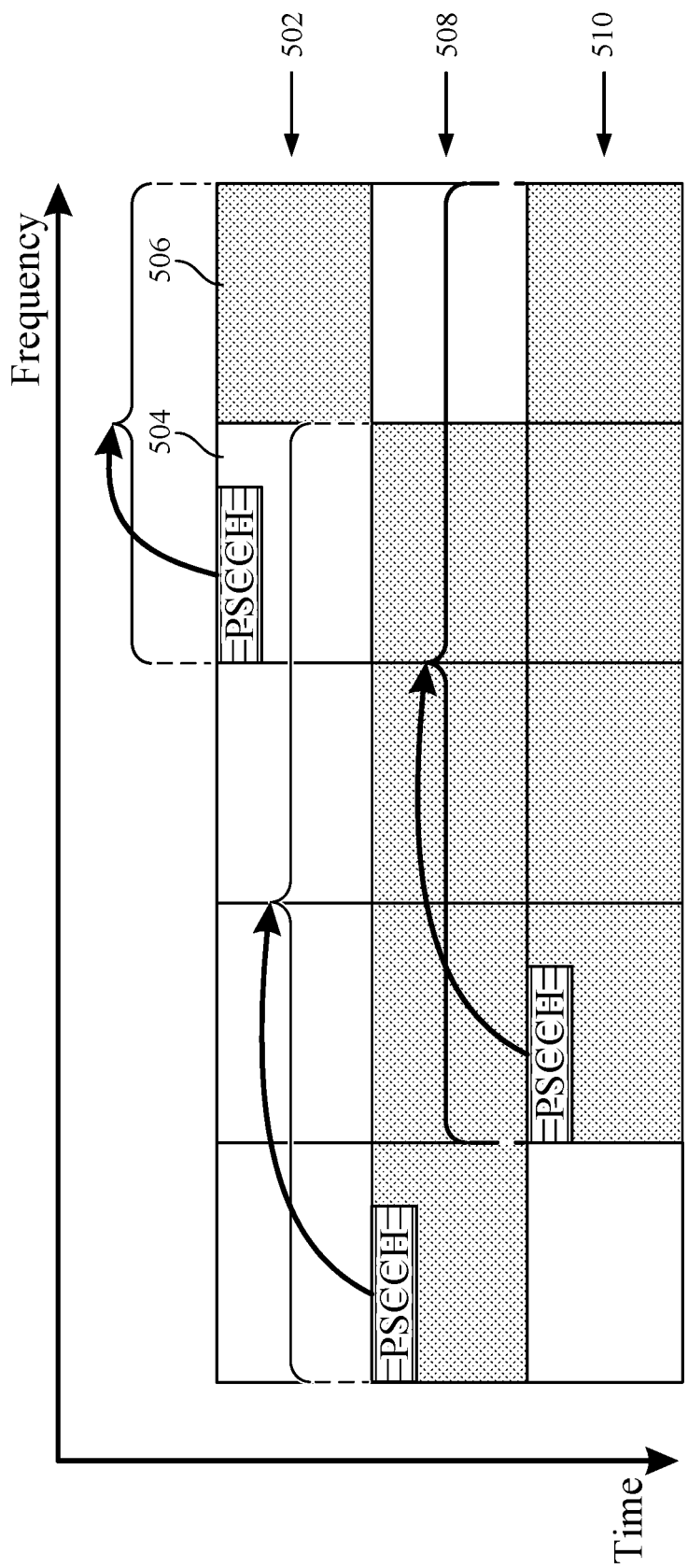
FIG. 5 shows a time-frequency grid illustrating example resource pools for sidelink communication.

FIG. 5 shows a time-frequency grid illustrating example resource pools for sidelink communication, according to certain aspects presented here. As can be seen, three different resource pools (e.g., 502, 504, and 506) are shown. The resource pool 502 may be composed of two sub-channels 508 (e.g., assigned a physical sidelink control channel (PSCCH) and a physical sidelink shared channel (PSSCH))

and 510 (e.g., assigned to the PSSCH), each of the two sub-channels 508 and 510 including a consecutive set of RBs spanning different frequencies. As shown, resources pool 504 and 506 may each include four sub-channels spanning different frequency bands.

In some cases, a sidelink resource pool may be defined by a number of parameters, such as the parameters sl-StartRB-Sub channel, sl-SubchannelSize, and sl-NumSubchannel, though it should be noted that they can be referred to in any suitable way. The parameter sl-StartRB-Subchannel may define the first RB of the lowest index sub-channel of the resource pool. For example, with reference to resource pool 502, the parameter sl-StartRB-Subchannel may specify the first RB of the sub-channel 508. Additionally, the parameter sl-SubchannelSize may define the number of RBs of each sub-channel in the resource pool and the parameter sl-NumSubchannel may define the number of sub-channels in the resource pool. Accordingly, for example, with reference to resource pool 502, the parameter sl-NumSubchannel may define resource pool 502 to include two sub-channels (e.g., 508 and 510) and the parameter sl-SubchannelSize may define that each of sub-channels 508 and 510 include 10 RBs to 100 RBs.

In some cases, within each sub-channel, a sidelink control channel, such as a physical sidelink control channel (PSCCH), may occupy a first number of RBs (e.g., where the number is the value of the parameter sl-FreqResourcePS-CCH) and a first number of symbols (e.g., where the number is the value of a parameter sl-TimeResourcePSCCH) of the first sub-channel assigned to a sidelink shared data channel, such as a physical sidelink shared channel (PSSCH). In some cases, control information included in the PSCCH may allocate, starting from a current sub-channel in which the PSCCH is transmitted, how many sub-channels may be included within the PSSCH.

In some cases, a UE may need to transmit feedback information to indicate whether certain transmissions on a PSSCH and/or PSCCH have been successfully received or not. This feedback information may include acknowledgement (ACK) that a transmission was successfully received and decoded and/or negative ACK (NACK) that a transmission was not successfully decoded corresponding to the transmissions on the PSSCH/PSCCH. In some cases, this feedback information may be transmitted on a feedback channel, known as a physical sidelink feedback channel (PSFCH). In order to transmit feedback information on the PSFCH, a set of resources may be selected from a non-dedicated PSFCH resource pool.

Figure 6:
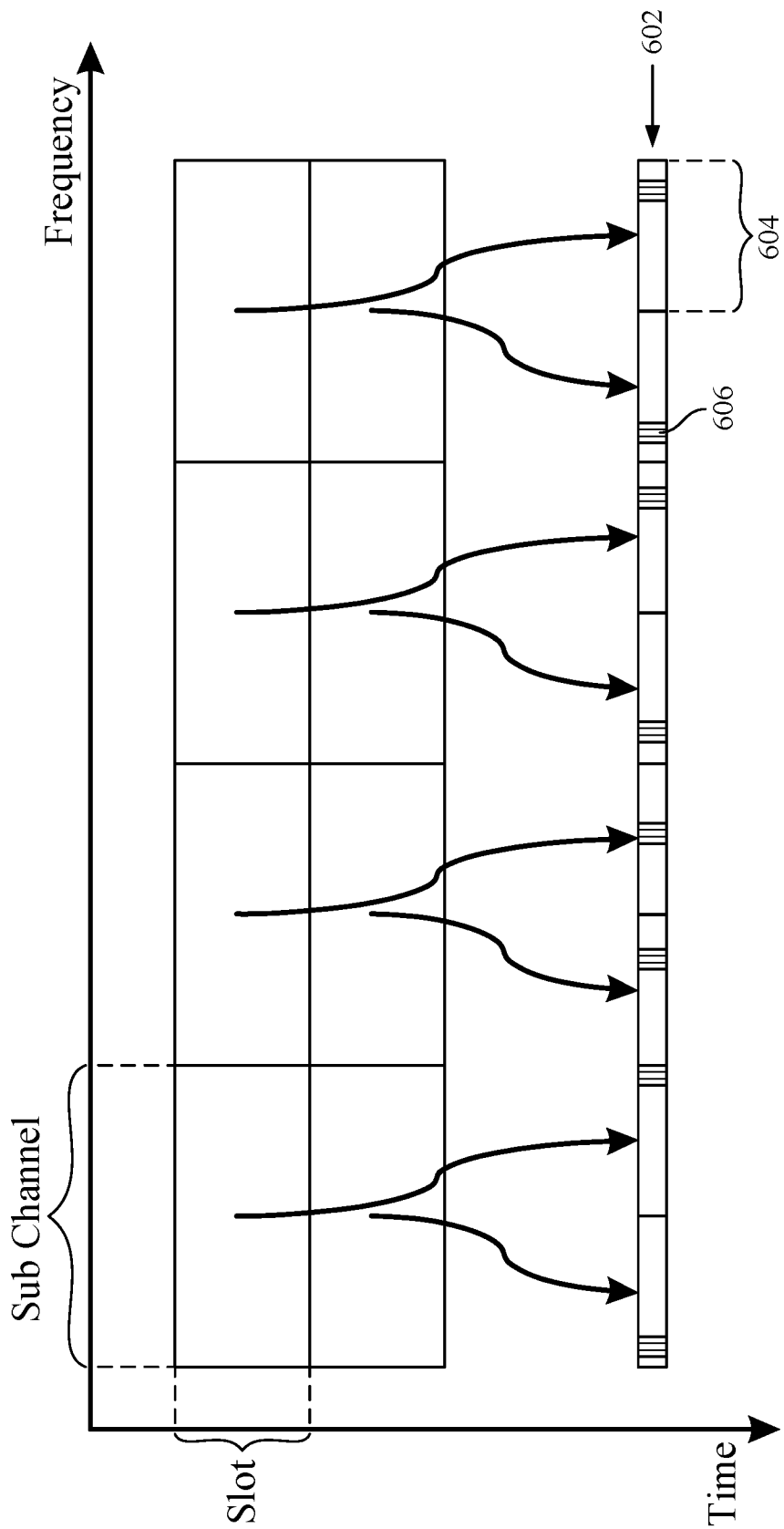
FIG. 6 illustrates an example sidelink feedback channel resource pool mapping.

An example PSFCH resource pool 602 is illustrated in FIG. 6. As shown, the PSFCH resource pool 602 may be separated into a set of separate sub-resource pools 604 each corresponding to a different sidelink sub-channels across different time slots. Though certain aspects are described in terms of slots, other appropriate time durations may similarly be used. For example, as shown in FIG. 6, a total of eight sub-channels across two time slots may be used to carry PSSCH/PSCCH information. Accordingly, the PSFCH resource pool 602 may be separated into eight different sub-resource pools 604 for carrying feedback information corresponding to the eight different sub-channels across the two time slots. Each sub-resource pool 604 may include a plurality of resources (e.g., RBs) and the UE may select one resource 606 of the plurality of resources within the sub-resource pool 604 to transmit the feedback information for each sub-channel.

Aspects Related to Channel Ratio Metrics for Beamformed Communication

Congestion may occur in certain wireless communication systems, such as sidelink V2X systems, due to increased network traffic. Congestion control may be implemented to control network congestion via certain parameters related to communication over V2X based on a level of the congestion. For example, in certain instances, there may not be a centralized entity to perform congestion control of spectrum usage. The congestion control may be performed without a centralized entity (e.g. eNB) to manage admission control and/or radio resource utilization (e.g. out-of-network coverage operation, and/or decentralized resource selection/reselection procedures). Without a centralized entity managing network resources and device communications, collisions of different communications may occur. Too many collisions may adversely affect the performance of the communication system. For example, collisions may occur when resources are not properly allocated to different device communications which may result in some devices not having sufficient resources for communication.

To this end, decentralized congestion control (DCC) may be needed to coordinate the usage of the channel. In DCC, all wireless communication devices (e.g., UEs) may cooperate to keep a channel (e.g., as sidelink channel) unsaturated, and resources may be shared among the wireless communication devices equally. In some cases, two metrics may be used to characterize a state of the channel for DCC, such as a channel busy ratio (CBR) and a channel occupancy ratio (CR), which may help control whether a particular UE is able to perform transmissions on the channel.

In the context of sidelink (SL), the CBR metric provides an estimation of the total state of a channel and may be defined as the portion of sub-channels in a resource pool whose measured SL received signal strength indicator (RSSI) exceeds a pre-configured RSSI threshold. More specifically, for example, the CBR metric may be measured/calculated in slot n and may be defined as the portion of sub-channels in the resource pool whose SL RSSI measured by a UE exceed a (pre-)configured threshold sensed over a CBR measurement window [n−a, n−1], where a is equal to 100 or $100 \cdot 2^\mu$ slots and is configured according to higher layer parameter timeWindowSize-CBR. SL RSSI may be defined as the linear average of the total received power (in watts) observed in a configured sub-channel in a number of OFDM symbols of a slot configured for PSCCH and PSSCH, starting from the second OFDM symbol of the slot. For frequency range 1 (FR1), a reference point for the SL RSSI shall be an antenna connector of the UE (e.g., RSSI measured without beam forming in FR1). For frequency range 2 (FR2), SL RSSI may be measured based on a combined signal from antenna elements corresponding to a given receiver branch. For FR1 and FR2, if receiver diversity is in use by the UE, the reported SL RSSI value may not be lower than a corresponding SL RSSI of any of the individual receiver branches.

Figure 7:
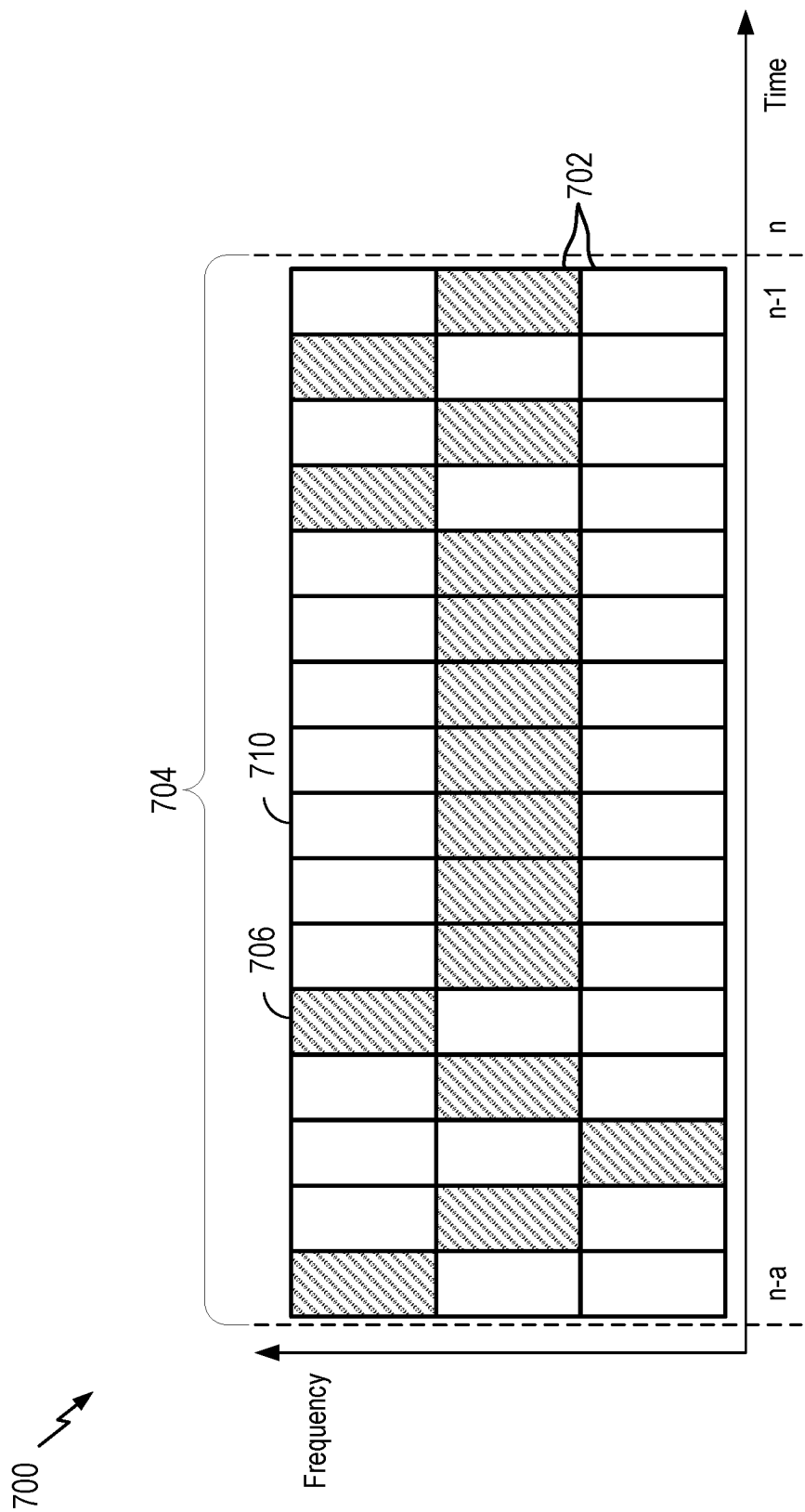
FIG. 7 provides an illustration of a resource pool for determining a channel busy ratio metric.

FIG. 7 provides an illustration of a resource pool 700 for determining a CBR metric. The resource pool 700 includes a plurality of sub-channels, which represented as a rectangular box spanning a range of frequencies and one slot (e.g., in time). Two example sub-channels are illustrated at 702. A CBR metric for the resource pool 700 may be evaluated at slot n within a CBR measurement window 704 ranging from slot n−a to slot n−1. As noted above, CBR may be defined as a portion of sub-channels of the resource pool 700 whose SL RSSI measured by a UE exceed a configured threshold sensed over a CBR measurement window 704. Within FIG. 7, sub-channels with similar shading as sub-channel 706 represent sub-channels whose SL RSSI is greater than a threshold RSSI while sub-channels without any shading, such as sub-channel 708, represent sub-channels whose SL RSSI is less than or equal to the threshold RSSI. As shown, the resource pool 700 includes 48 sub-channels and the number of sub-channels whose SL RSSI is greater than the threshold RSSI includes 16 sub-channels. Accordingly, the CBR metric for the resource pool 700 evaluated within the CBR measurement window 704 may be determined according to Equation 1, below.

$$CBR = \frac{\text{number of sub-channels with } RSSI \text{ above threshold}}{\text{total number of sub-channels}} = \frac{16}{48} = .33 \quad (1)$$

As noted above, the other metric for to characterizing the state of the channel for DCC is channel occupancy ratio (CR), which provides an indication of channel utilization by a UE itself. The CR metric is evaluated at slot n and may be defined as the total number of sub-channels used for transmissions by the UE in slots [n−a, n−1] and in future granted in slots [n, n+b] divided by the total number of configured sub-channels in the transmission resource pool over [n−a, n+b], where a is a positive integer and b is 0 or a positive integer. In some cases, a and b are determined by UE implementation with a+b+1=1000 or $1000 \cdot 2^\mu$ slots, according to a higher layer parameter timeWindowSize-CR, and b<(a+b+1)/2. Additionally, n+b may not exceed the last transmission opportunity of a grant for a current transmission.

Figure 8:
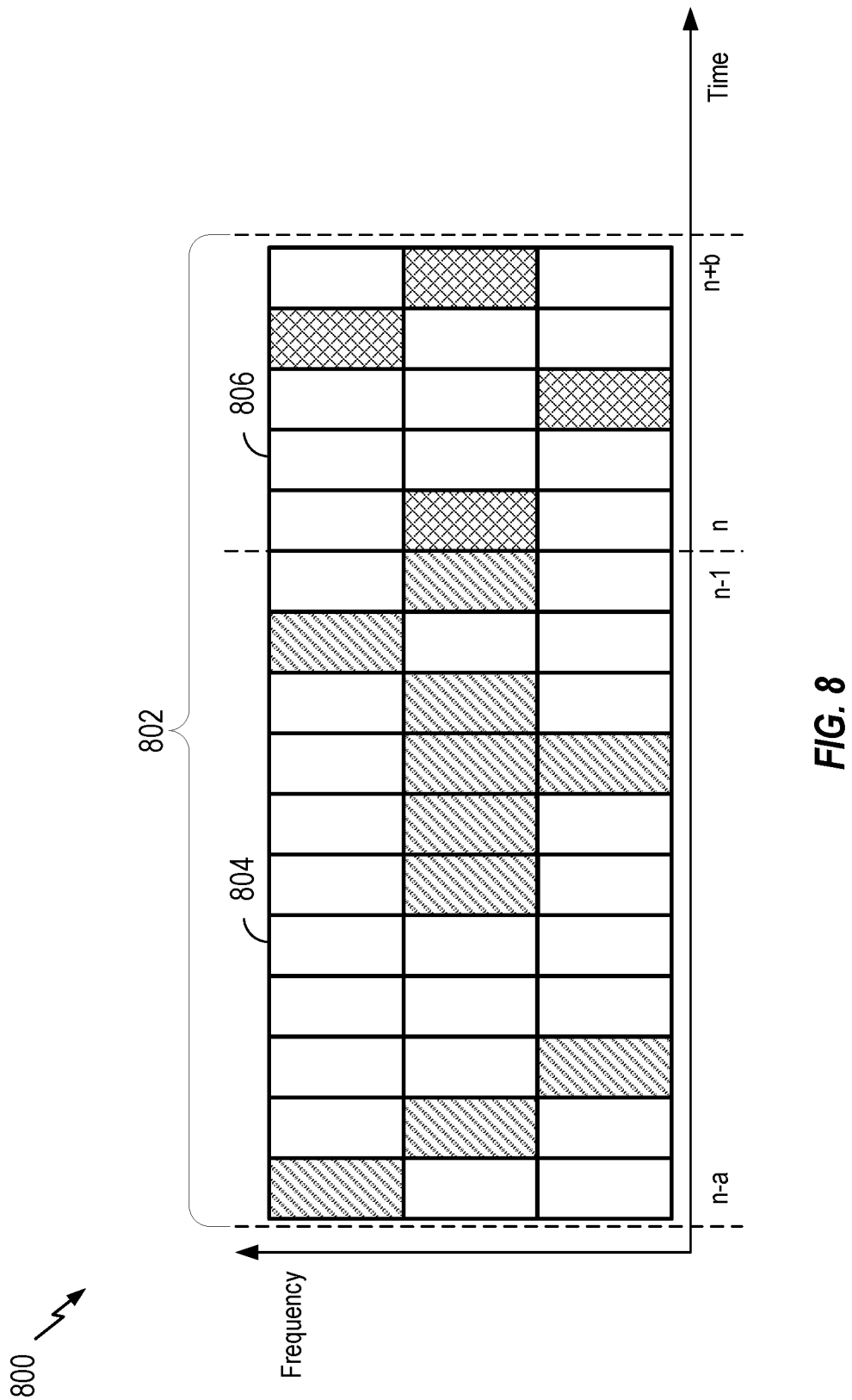
FIG. 8 provides an illustration of a resource pool for determining a channel occupancy ratio metric.

FIG. 8 provides an illustration of a resource pool 800 for determining a CR metric. As shown, the resource pool 800 includes a plurality of sub-channels ranging from slot n−a to slot n+b in time window 802. As noted above, the CR metric for the resource pool 800 may be evaluated in slot n and includes the total number of sub-channels previously used for transmissions by the UE in slots n−a to n−1 as well as future granted transmissions in slots n to n+b. As shown in FIG. 8, the resource pool 800 includes 48 sub-channels ranging across slots n−a to n+b of the time window 802. Within slots n−a to n−1, ten sub-channels have been used by the UE for transmissions. Additionally, the UE has four future granted transmissions within slots n to n+b. Accordingly, the CR metric for the resource pool 800 may be determined according to Equation 2, below.

$$CR = \frac{\text{number of sub-channels used for transmission by the } UE}{\text{total number of sub-channels}} = \frac{14}{48} = .29 \quad (2)$$

As noted above, sidelink communication between UEs may be performed using beamforming via one or more mmWave frequencies. However, current wireless standards do not specify any particular beam, spatial filters, or quasi-colocation (QCL) information to use for performing the measurements for determining the CBR and CR metrics, which may cause issues with such beamformed communication.

For example, as noted above, the CBR and CR metrics may be used for determining whether a particular UE is permitted to transmit on a channel or not. More specifically, CBR may be used for determining one or more transmission parameters used by the UE when performing transmissions. These transmission parameters may include, for example, a modulation and coding scheme (MCS), a transmission bandwidth, and a CR limit. The CR limit is a threshold CR for which the UE should not exceed. When the UE decides to transmit one or more packets, the UE may map a current CBR to a corresponding CR limit value. If the determined CR (e.g., which, as noted above, takes into account past and future granted transmissions by the UE) is above the CR limit, the UE may need to reduce the number of future granted transmissions so as to not interfere with transmissions of another UE.

However, because the UE may transmit in different transmit directions when using beam forming, whether the UE exceeds the CR limit in one transmit direction may not necessarily mean the UE exceeds the CR limit for another transmit direction. For example, in some cases, the UE may see a busy channel (e.g., determined CBR is above a threshold) in a first transmit direction while also seeing an idle channel (e.g., determined CBR is equal to or below a threshold) in a second transmit direction. As such, the UE should be allowed to use the idle channel to perform one or more transmissions. However, because CBR and CR determination in current wireless communication standards do not take into account beams/transmit directions, the UE may be prevented from using the idle channel in the second transmit direction simply because the UE observes a busy channel (e.g., determined CBR is above a threshold) in the first transmit direction. This can lead to wasted time and frequency resources within a network as well as wasted power resources at the UE, for example, due to the UE having to wait to perform the one or more transmissions until the determined CBR becomes low (e.g., equal to or below a threshold) even though the UE would otherwise be permitted to transmit the one or more on the idle channel.

Thus, aspects of the present disclosure provide techniques to help resolve these possible issues, which may involve taking into account one or more beams when determining CBR and CR for beamformed communication. For example, such techniques may involve determining one or more channel ratio metrics, such as CBR and/or CR, for a first beam of a plurality of beams and transmitting signaling via the first beam based on the one or more channel ratio metrics. In some cases, the one or more channel ratio metrics for the first beam may depend on the one or more channel ratio metrics of a second beam. This may be the case when the second beam is transmitted in a similar direction as the first beam such that transmissions on the second beam may interact with transmissions on the first beam.

FIG. 9 provides an illustration of the interaction between beams associated with a UE, such as the UE 104 illustrated in FIG. 1. As shown, the UE 104 may communicate using beam forming on one or more beams, such as a first beam 902 and a second beam 904, which, as shown, may be oriented in similar directions. In some cases, such communication may be performed on a sidelink channel between the UE 104 and another UE, such as UE 103 illustrated in FIG. 1, or on an access link with another wireless device, such as BS 102. Due to the nature of beam forming, each of the beams 902 and 904 may be composed of a main lobe and two side lobes. For example, as shown, the first beam 902 is composed of a main lobe 902a, a first side lobe 902b, and a second side lobe 902c. Similarly, the second beam 904 is composed of a main lobe 904a, a first side lobe 904b, and a second side lobe 904c.

When the UE 104 transmits on the first beam 902, most of the transmit energy may propagate in the direction main lobe 902a. However, a small portion of the transmit energy associated with the first beam 902 may also propagate in the direction of the side lobe 902b (as well as 902c), which, as shown, coincides with the direction of the main lobe 904a of the second beam 904. Similarly, when the UE 104 transmits on the second beam 904, most of the transmit energy may propagate in the direction main lobe 904a. However, some transmit energy associated with the second beam 904 may also propagate in the direction of the side lobe 904b (as well as 904c), which, as shown, coincides with the direction of the main lobe 902a of the first beam 902.

As a consequence, when transmitting signaling on one or more sub-channels using the first beam 902, the UE 104 may occupy one or more sub-channels in the direction of the main lobe 904a of the second beam 904, but at a reduced level (e.g., reduced number of sub-channels) as compared to the main lobe 902a of the first beam 902. Similarly, when transmitting signaling on a channel using the second beam 904, the UE 104 may occupy one or more sub-channels in the direction of the main lobe 902a of the first beam 902, but at a reduced level as compared to the main lobe 904a of the second beam 904. Accordingly, because sub-channel occupation associated with the first beam 902 may be affected by transmissions using the second beam 904, the CBR and CR metrics for the first beam 902 may need to take into account the CBR and CR metrics for the second beam 904, and vice versa. Taking into account the CBR and CR metrics of the second beam 904 when determining the CBR and CR metrics of the first beam 902 may result in more accurate CBR and CR metrics for the first beam 902, which reduces the chances of being interfered by the second beam 904 as well as reducing the chances of causing interference to the second beam 904.

In some cases, whether transmissions on the first beam 902 result in the occupation of one or more sub-channels in the direction of the second beam 904 (e.g., such that the CBR and CR metrics for the second beam 904 needs to be taken into account in the CBR and CR metric of the first beam 902) may depend on an angular separation (e.g., in degrees) between the first beam 902 and the second beam 904. For example, when the angular separation between the first beam 902 and the second beam 904 is greater than or equal to a threshold, the UE 104 may not need to take into account the CBR and CR metrics of the second beam 904 when determining the CBR and CR metrics for the first beam 902. In other cases, when the angular separation between the first beam 902 and the second beam 904 is less than the threshold, the UE 104 may take the CBR and CR metrics of the second beam 904 into account when determining the CBR and CR metrics for the first beam 902, as described in greater detail below.

Figure 10:
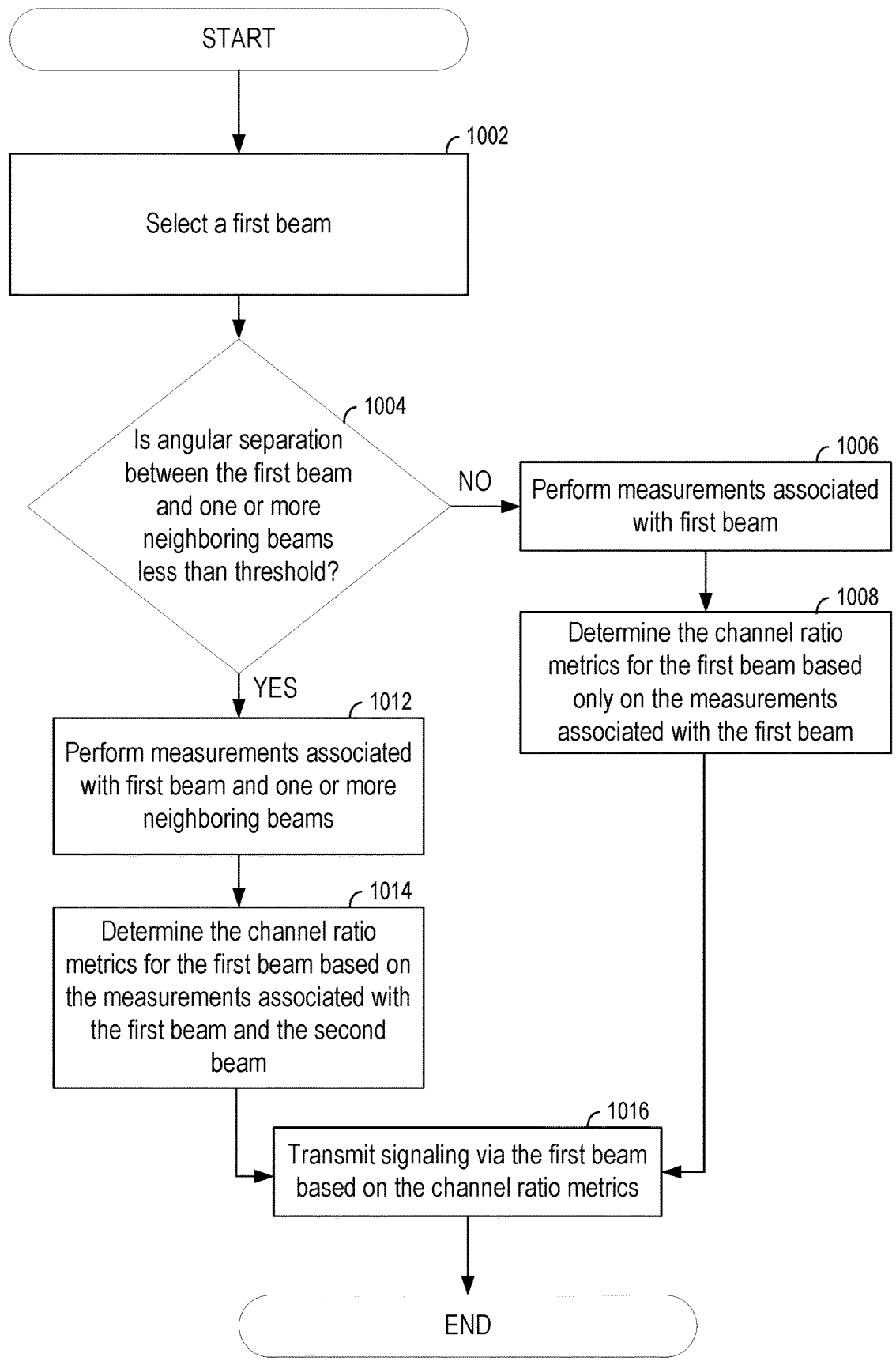
FIG. 10 is a decision flow diagram illustrating an example process for determining channel ratio metrics for beamformed communication.

Example Process for Determining and Using Channel Ratio Metrics for Beamformed Communication FIG. 10 is a decision flow diagram, illustrating an example process 1000 for determining channel ratio metrics for beamformed communication. In some cases, the process 1000 may be performed by a wireless communication device, such as UE 104, when communicating using beamforming. In some cases, such communication may be performed with another UE on a sidelink communication like or with another wireless communication device, such as BS 102, on an access communication link. The process 1000 may be implemented as software components that are executed and run on one or more processors (e.g., controller/processor 280 of FIG. 2). Further, the transmission and reception of signals by the UE in process 1000 may be enabled, for example, by one or more antennas (e.g., antennas 252 of FIG. 2). In certain aspects, the transmission and/or reception of signals by the UE may be implemented via a bus interface of one or more processors (e.g., controller/processor 280, including the communication component 281) obtaining and/or outputting signals.

As illustrated, the process 1000 begins at 1002 the UE selecting a first beam of a plurality of beams for determining one or more channel ratio metrics. In some cases, the first beam may be selected by the UE for transmitting signaling.

Thereafter, as illustrated at 1004, the UE determines whether an angular separation between the first beam and one or more neighboring beams of the plurality of beams is less than a threshold. In some cases, the angular separation between the first beam and the one or more neighboring beams may be determined as the angular separation between, for example, a main lobe of the first beam and a side lobe of the second beam.

If, at 1004, the UE determines that the angular separation between the first beam and the one or more neighboring beams is not less than the threshold (e.g., the angular separation is greater than or equal to the threshold), process 1000 moves to 1006 where the UE performs one or more first measurements associated with the first beam. As will be described below, the one or more first measurements may include, for example, RSSI measurements for one or more sub-channels associated with the first beam and/or a determination/measurement of a number of sub-channels that have been, or are expected to be, used by the UE for transmissions via the first beam on a corresponding channel.

Thereafter, at 1008, the UE determines one or more channel ratio metrics for the first beam based, at least in part, on an angular separation between the first beam and the one or more neighboring beams. In some cases, the one or more channel ratio metrics may include, for example, a CBR metric and/or a CR metric. In some cases, because the angular separation between the first beam and the one or more neighboring beams is greater than or equal to the threshold, the UE may determine the one or more channel ratio metrics based on the one or more first measurements associated with the first beam and not based on measurements associated with the one or more neighboring beams. For example, when the angular separation between the first beam and the one or more neighboring beams is greater than or equal to the threshold, the UE may not need to take into account measurements or channel ratio metrics associated with the one or more neighboring beams since the first beam and the one or more neighboring beams are sufficiently distanced from each other (e.g., spatially, in terms of degrees) that transmissions on the one or more neighboring beams may not affect sub-channel occupation on the first beam.

Thereafter, as illustrated at 1016, the UE transmits signaling via the first beam based on the one or more channel ratio metrics. For example, in some cases, the UE may determine one or more transmission parameters based on the one or more channel ratio metrics that may be used when transmitting the signaling via the first beam. As noted above, these transmission parameters may include, for example, an MCS, a transmission bandwidth, a transmission power, a CR limit, and the like.

Returning to 1004, if the UE determines that the angular separation between the first beam and the one or more neighboring beams is less than the threshold, the process 1000 moves to 1012 where the UE performs one or more first measurements associated with the first beam. Additionally, at 1012, the UE performs one or more second measurements associated with the one or more neighboring beams. The one or more first measurements may include, for example, RSSI measurements for one or more sub-channels associated with the first beam and/or a determination/measurement of a number of sub-channels that have been, or are expected to be, used by the UE for transmissions via the first beam on a corresponding channel. Likewise, the one or more second measurements may include, for example, RSSI measurements for one or more sub-channels associated with the one or more neighboring beams and/or a determination/measurement of a number of sub-channels that have been, or are expected to be, used by the UE for transmissions via the one or more neighboring beams on a corresponding channel. The manner in which the UE performs the one or more first measurements and one or more second measurements is described in further detail below with respect to FIGS. 11-13

Thereafter, at 1024, the UE determines the one or more channel ratio metrics (e.g., CBR and/or CR) for the first beam based, at least in part, on an angular separation between the first beam and the one or more neighboring beams. In some cases, because the angular separation between the first beam and the one or more neighboring beams, as determine at 1004, is less than the threshold, the UE may determine the one or more channel ratio metrics based on the one or more first measurements associated with the first beam as well as based on the one or more second measurements associated with the one or more neighboring beams. For example, when the angular separation between the first beam and the one or more neighboring beams is less than the threshold, the UE may need to take into account the measurements and channel ratio metrics associated with the one or more neighboring beams since the first beam and the one or more neighboring beams are not sufficiently distanced from each other (e.g., spatially, in terms of degrees) and, as such, transmissions on the one or more neighboring beams may affect sub-channel occupation on the first beam. The manner in which the UE determines the one or more channel ratio metrics is described in further detail below with respect to FIGS. 11-13

Thereafter, the process 1000 again continues to 1016 where the UE transmits signaling via the first beam based on the one or more channel ratio metrics.

Channel Busy Ratio Metric Determination

As noted above, the one or more channel metrics determined at 1014 in FIG. 10 (as well as 1008) may include a CBR metric. The CBR metric may be defined as a number sub-channels associated with the first beam within a resource pool that have a received signal strength indicator (RSSI) exceeding an RSSI threshold sensed within a CBR window.

Figure 11:
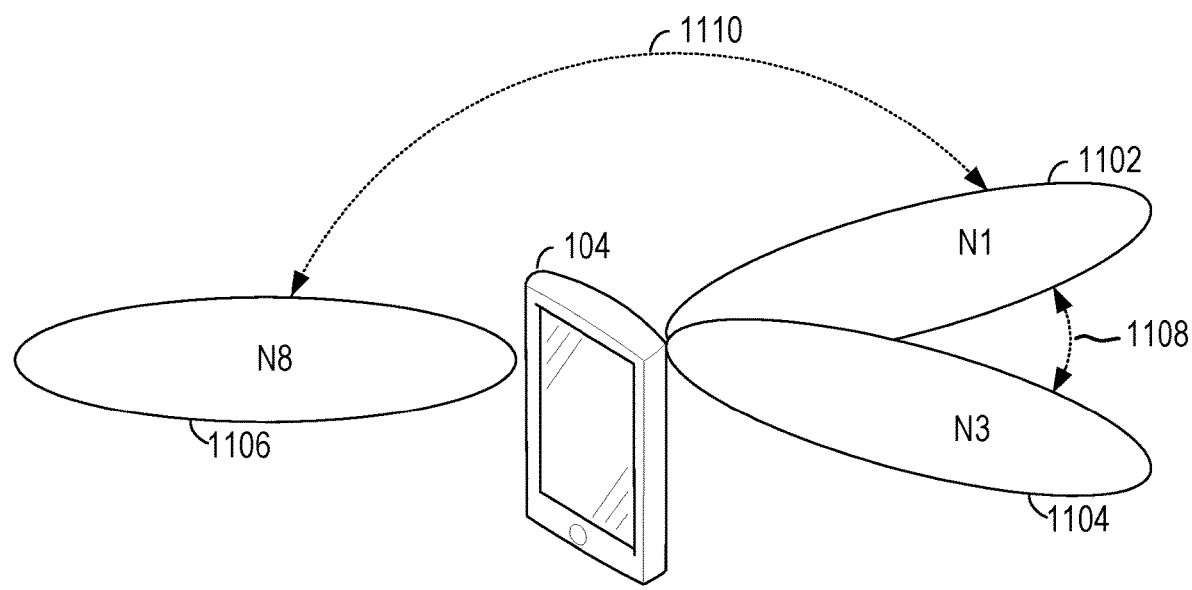
FIG. 11 shows different beams associated with a user equipment for illustrating the determination of one or more channel ratio metrics.

FIG. 11 shows different beams associated with a UE 104 for illustrating the determination of one or more channel ratio metrics. For example, as shown, the UE 104 may be able to communicate on three different beams, such as a first beam 1102 (e.g., N1), a second beam 1104 (e.g., N3), and a third beam 1106 (e.g., N8). From the perspective of the first beam 1102, the second beam 1104 and third beam 1106 may be considered neighboring beams. Additionally, in some cases, it may be assumed that a set of sub-channels used for transmitting on the first beam 1102 do not overlap with either of the second beam 1104 or the third beam 1106.

Additionally, in some cases, an angular separation 1110 between the first beam 1102 and the third beam 1106 may be greater than or equal to a threshold. As such, when determining the one or more channel ratio metrics, such as the CBR and CR metrics, for the first beam 1102 the UE 104 may not need to take into account CBR and CR metrics associated with the third beam 1106 (e.g., since no side lobes associated with the third beam 1106 will overlap with a main lobe of the first beam 1102).

In some cases, however, an angular separation 1108 between the first beam 1102 and the second beam 1104 may be less than a threshold. As such, in this case, the UE 104 may need to take into account the CBR and CR metrics associated with the second beam 1104 when determining the CBR and CR metrics associated with the first beam 1102 and vice versa (e.g., since at least one side lobe associated with the second beam 1104 will overlap with a main lobe of the first beam 1102).

In some cases, the CBR metric for the different beams of the UE 104 may be determined in different manners. For example, with respect to the CBR metric for the first beam 1102, a first manner of determining the CBR metric for the first beam 1102 may involve using a same RSSI threshold but applying a compensation factor to the CBR metric for the second beam 1104. A second manner may involve using different RSSI threshold for the first beam 1102 as compared to the second beam 1102.

Figure 12A:
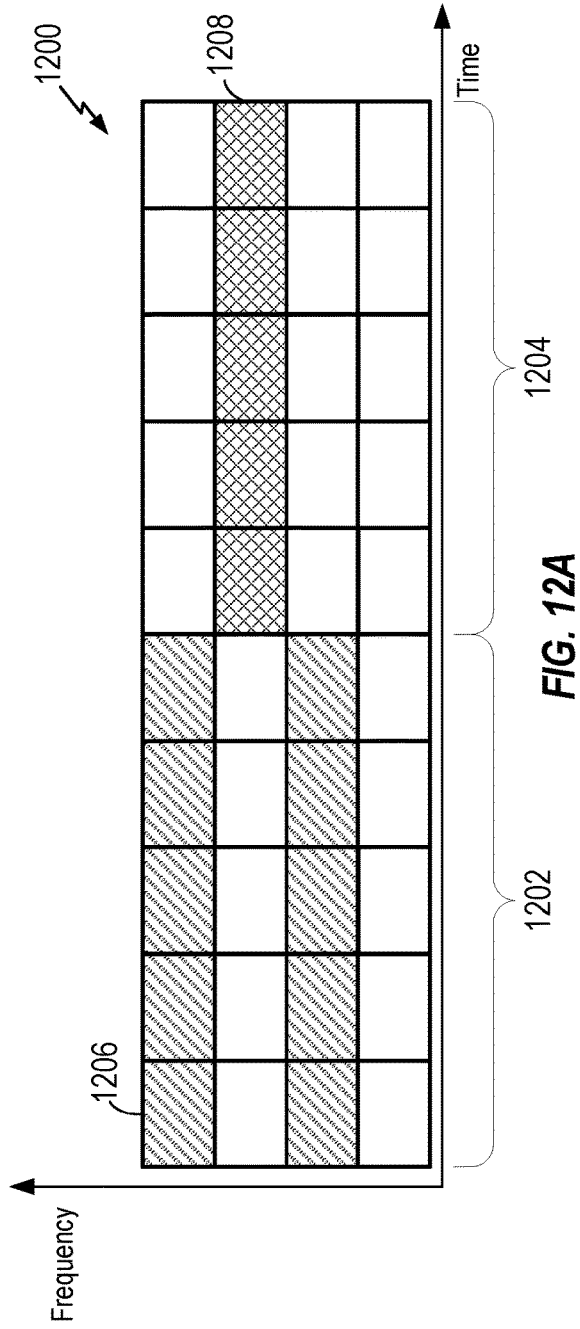
FIGS. 12A-12B illustrate different manners for determining a channel busy ratio metric.

FIG. 12A provides an illustration of the first manner of determining the CBR metric for the first beam 1102 based on a resource pool 1200. For example, as shown, the resource pool 1200 may comprise a plurality of sub-channels (e.g., 40, as shown) spanning across a range of frequencies and time slots. To determine the CBR metric for the first beam 1102, the UE 104 may perform one or more first measurements associated with the first beam 1102 and one or more second measurements associated with the second beam 1104, as described above with respect to 1012 illustrated in FIG. 10.

In some cases, performing the one or more first measurements associated with the first beam 1102 may include performing RSSI measurements for a first plurality of sub-channels 1202 in a resource pool 1200. Likewise, performing the one or more second measurements associated with the second beam 1104 comprises performing RSSI measurements for a second plurality of sub-channels 1204 in the resource pool 1200. In some cases, the first plurality of sub-channels 1202 and second plurality of sub-channels 1204 do not overlap in the resource pool 1200, as shown.

Thereafter, the UE 104 may determine which sub-channels in each of the first plurality of sub-channels 1202 and the second plurality of sub-channels 1204 have RSSI measurements above a threshold. For example, when determining the one or more channel ratio measurements at 1014 in FIG. 10, the UE 104 may determine, based on the RSSI measurements for the first plurality of sub-channels 1202, a first number of sub-channels associated with the first beam 1102 with RSSI measurements greater than a first RSSI threshold. Additionally, the UE 104 may also determine, based on the RSSI measurements for the second plurality of sub-channels 1204, a second number of sub-channels associated with the second beam 1104 with RSSI measurements greater than a second RSSI threshold. As noted above, when determining the CBR metric according to the first matter, the first RSSI threshold and second RSSI threshold may comprise a same RSSI threshold.

For example, with respect to FIG. 12A, the UE may determine that the sub-channels with similar shading as sub-channel 1206 in the first plurality of sub-channels 1202 have RSSI measurements above the first RSSI threshold (e.g., which, as noted, is the same as the second RSSI threshold) and that the sub-channels with similar shading as sub-channel 1208 in the second plurality of sub-channels 1204 have RSSI measurements above the second RSSI threshold (e.g., which, as noted, is the same as the first RSSI threshold). Accordingly, as illustrated in FIG. 12A, the UE 104 may determine that the first number of sub-channels associated with the first beam 1102 with RSSI measurements greater than the first RSSI threshold includes ten sub-channels. Additionally, the UE 104 may determine that the second number of sub-channels associated with the second beam 1104 with RSSI measurements greater than the second RSSI threshold includes five sub-channels.

Thereafter, to determine the CBR metric for the first beam 1102 according to the first manner, the UE 104 may apply a compensation factor (e.g., a) to the second number of sub-channels to generate a compensated second number of sub-channels. In some cases, the compensation factor may be a value ranging from zero to one (e.g., $0 \leq \alpha \leq 1$). The compensation factor may be used to adjust the second number of sub-channels with RSSI measurements greater than the second RSSI threshold to include only those sub-channels associated with the second beam 1104 that are likely received in a same direction as the first beam 1102 (e.g., sub-channels received on a side lobe of the second beam 1104) while disregarding sub-channels associated with the second beam 1104 that are not likely received in the same direction of the first beam 1102 (e.g., such as sub-channels received on a main lobe of the second beam 1104).

The UE 104 may then add the first number of sub-channels to the compensated second number of sub-channels to generate a total number of sub-channels with RSSI measurements greater than the same RSSI threshold (e.g., greater than both the first and second RSSI threshold, which are the same). Thereafter, the UE may divide the total number of sub-channels with RSSI measurements greater than the same RSSI threshold by a total number of sub-channels in the first plurality of sub-channels and the second plurality of sub-channels (e.g., 40), resulting in the CBR metric for the first beam 1102. More specifically, for example, the CBR metric for the first beam may be determined according to Equation 3, below.

$$CBR = \frac{\# \text{ sub-channels} \geq t1 \text{ using first beam} + \alpha \times (\# \text{ sub-channels} \geq t1 \text{ using second beam})}{\text{total number of sub-channels measured using first and second beam}} \quad (3)$$

In Equation 3, t1 represents the same RSSI threshold (e.g., first RSSI threshold=second RSSI threshold). Accordingly, assuming a compensation factor of 0.25, the CBR metric for the first beam 1102 may be:

$$CBR = \frac{10 + .25 \times (5)}{40} = .28.$$

The CBR metric for the second beam 1104 may also be determined in a similar manner, as shown in Equation 4, below.

$$CBR = \frac{\# \text{ sub-channels} \geq t1 \text{ using second beam} + \alpha \times (\# \text{ sub-channels} \geq t1 \text{ using first beam})}{\text{total number of sub-channels measured using first and second beam}} \quad (4)$$

Again assuming a compensation factor of 0.25, the CBR for the second beam 1002 may be:

$$CBR = \frac{5 + .25 \times (10)}{40} = .18.$$

As noted above, the second manner of determining the CBR metric may be to apply different RSSI thresholds to different beams. For example, instead of the first RSSI threshold and second RSSI threshold being the same, as described above, the first RSSI threshold and second RSSI threshold may be different when determining the CBR metric according to the second manner.

Figure 12B:
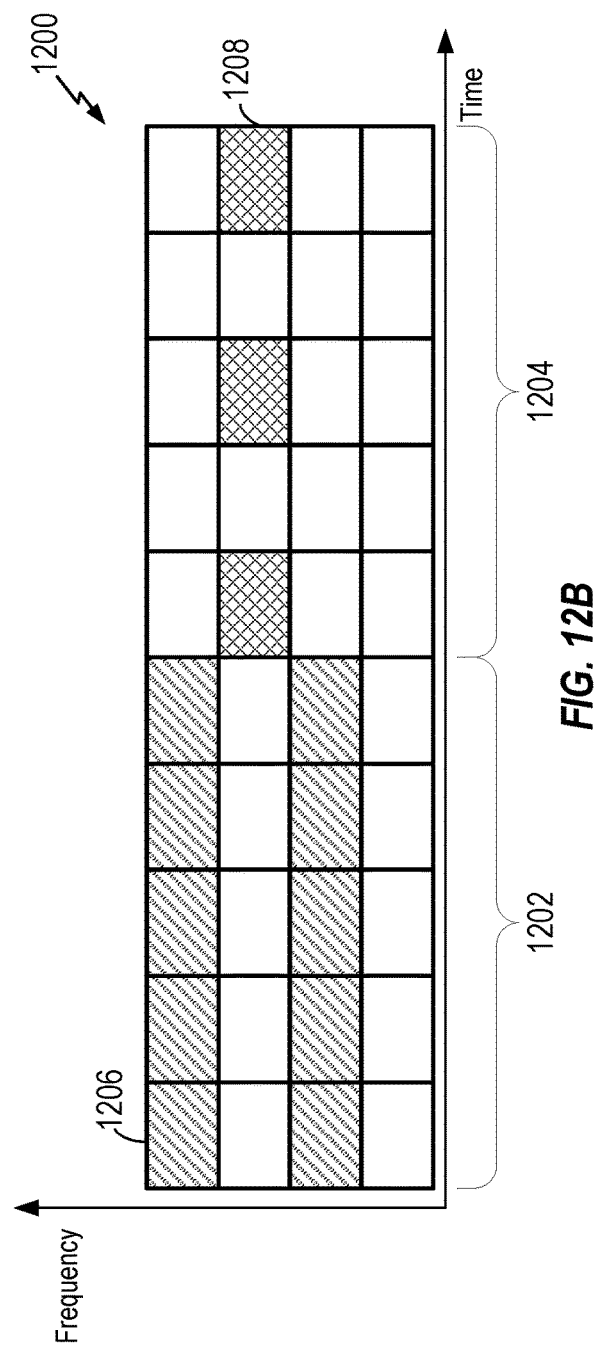

FIG. 12B provides an illustration provides an illustration of the second manner of determining the CBR metric for the first beam 1102 illustrated in FIG. 11 based on the resource pool 1200. The process for determining the CBR metric according to the second manner in FIG. 12B is similar to that described above with respect to FIG. 12A, except that the first RSSI threshold associated with the first beam 1102 is different from the second RSSI threshold associated with the second beam 1104. In some cases, because an amount of transmit energy associated with a side lobe of the second beam 1104 that may propagate in a same direction as a main lobe of the first beam 1102 is expected to be low, the second RSSI threshold for the second beam 1104 may be set higher than the first RSSI threshold. The rationale behind setting the second RSSI threshold associated with the second beam 1104 to a higher level than the first RSSI threshold associated with the first beam 1102 is that transmissions on the second beam 1104 may have less potential to cause interference to transmissions in the direction of the first beam 1102 and, thus, it may be beneficial to count less sub-channels associated with the second beam 1104 when determining the CBR metric for the first beam.

Accordingly, when determining the CBR metric for the first beam 1102 according to the second manner, the UE 104 may again measure the sub-channels in the first plurality of sub-channels 1202 associated with the first beam 1102 and the second plurality of sub-channels 1204 associated with the second beam 1104. Thereafter, the UE 104 may determine, from the first plurality of sub-channels 1202, a first number of sub-channels associated with the first beam 1102 with RSSI measurements greater than a first RSSI threshold and may also determine, from the second plurality of sub-channels 1204, a second number of sub-channels associated with the second beam 1104 with RSSI measurements greater than a second RSSI threshold. As illustrated, the first number of sub-channels may include sub-channels with similar shading as sub-channel 1206 or ten sub-channels. Further, because the second RSSI threshold used in FIG. 12B is set higher, fewer number of sub-channels may be included within the second number of sub-channels associated with the second beam 1104 as compared to FIG. 12A. For example, only three sub-channels with similar shading as sub-channel 1208 may be included within the second number of sub-channels in FIG. 12B.

Thereafter, the UE 104 may determine the CBR metric according to the second manner by adding the first number of sub-channels to the second number of sub-channels to generate a total number of sub-channels with RSSI measurements greater than at least one of the first RSSI threshold or the second RSSI threshold. The UE 104 may then divide the total number of sub-channels with RSSI measurements greater than at least one of the first RSSI threshold or the second RSSI threshold by a total number of sub-channels in the first plurality of sub-channels and the second plurality of sub-channels. More specifically, for example, the CBR metric for the first beam may be determined according to Equation 5, below.

$$CBR = \frac{\text{\# sub-channels} \geq t1 \text{ using first beam} + \text{\# sub-channels} \geq t2 \text{ using second beam}}{\text{total number of sub-channels measured using first and second beam}} \quad (5)$$

In Equation 5, t1 represents the first RSSI threshold while t2 represents the second RSSI threshold. Accordingly, the CBR metric for the first beam 1102 may be $$CBR = \frac{10+3}{40} = \sim .33.$$

The CBR metric for the second beam 1104 may also be determined in a similar manner, as shown in Equation 6, below.

$$CBR = \frac{\text{\# sub-channels} \geq t1 \text{ using second beam} + \text{\# sub-channels} \geq t2 \text{ using first beam}}{\text{total number of sub-channels measured using first and second beam}} \quad (6)$$

Channel Occupancy Ratio Metric Determination

As noted above, the one or more channel metrics determined at 1014 in FIG. 10 (as well as 1008) may includes a CR metric, which may be defined as a number sub-channels associated with a beam within a resource pool that have been used or that are expected to be used for transmissions using the beam in a period of time.

FIG. 13 provides an illustration of a resource pool 1300 used to determine a CR metric for one or more beams, such as the first beam 1102, the second beam 1104, and/or the third beam 1106 illustrated in FIG. 11. As shown, the resource pool 1300 includes a plurality of sub-channels ranging from slot n−a to slot n+b in a time window 1302. The CR metric for a particular beam may be evaluated in slot n and includes the total number of sub-channels previously used for transmissions, via the beam, by the UE in slots n−a to n−1 as well as future granted transmissions via the beam in slots n to n+b. As shown in FIG. 13, the resource pool 1300 includes 76 sub-channels ranging across slots n−a to n+b of the time window 1302.

Accordingly, to determine the CR metric for a particular beam, the UE 104 may need to determine how many sub-channels associated with that particular beam have been used or are expected to be used within a particular period of time, such as the time window 1302. In some cases, the sub-channels expected to be used may include sub-channels for which the UE 104 have been granted to perform transmissions in the future. Additionally, when the angular separation between the first beam and one or more neighboring beams is less than a threshold, the UE 104 may also need to take into account the number of sub-channels associated with the one or more neighboring beams that have been used or are expected to be used within the particular period of time. These determinations may be made based on the one or more first measurements and one or more second measurements performed at 1012 in FIG. 10.

For example, with respect to the first beam 1102 illustrated in FIG. 11, performing the one or more first measurements associated with the first beam may include determining, from the resource pool 1300 of FIG. 13, a first number of sub-channels, associated with the first beam, that have been used or are expected to be used for transmissions using the first beam within a period of time, such as the time window 1302. Additionally, performing the one or more second measurements may include determining, from the resource pool 1300, a second number of sub-channels, associated with the second beam 1104, that have been used or are expected to be used for transmissions using the second beam 1104 within the time window 1302.

Within FIG. 13, sub-channels within similar shading to that of sub-channel 1304 are sub-channels that have been, or are expected to be, used for transmissions via the first beam 1102. Similarly, sub-channels within similar shading to that of sub-channel 1306 are sub-channels that have been, or are expected to be, used for transmissions via the second beam 1104. Likewise, sub-channels within similar shading to that of sub-channel 1308 are sub-channels that have been, or are expected to be, used for transmissions via the third beam 1106.

Accordingly, for example, based on the one or more first measurements, the UE 104 may determine that 13 sub-channels have been used for transmissions using the first beam 1102 within slots n−a to n−1 of the time window 1302. Additionally, the UE 104 may determine that four sub-channels are expected to be used (e.g., granted for future use) for transmissions using the first beam 1102 within slots n to n+b of the time window 1302. Accordingly, based on the one or more first measurements, the UE 104 may determine first number of sub-channels associated with the first beam 1102 to include 17 sub-channels.

Similarly, based on the one or more second measurements, the UE 104 may determine that eight sub-channels have been used for transmissions using the second beam 1104 within slots n−a to n−1 of the time window 1302 and eight sub-channels are expected to be used for transmissions using the second beam 1104 within slots n to n+b of the time window 1302. As such, the UE 104 may determine that the second number of sub-channels associated with the second beam 1104 includes 16 sub-channels.

Thereafter, the UE 104 may determine the CR metric for the first beam 1102 based on the first number of sub-channels associated with the first beam 1102 and the second number of sub-channels associated with the second beam 1104. In some cases, to determine the CR metric for the first beam 1102, the UE 104 may apply a compensation factor (e.g., a) to the second number of sub-channels associated with the second beam 1104, as shown in Equation 7, below.

$$CR = \frac{\text{first \# of sub-channels} + \alpha(\text{second \# of sub-channels})}{\text{total number of sub-channels in resource pool}} \quad (7)$$

As can be seen in Equation 7, the UE 104 may apply the compensation factor to the second number of sub-channels associated with the second beam 1104 to generate a compensated second number of sub-channels. The UE 104 may then add the first number of sub-channels associated with the first beam 1102 to the compensated second number of sub-channels to generate a total number of sub-channels that have been used by, or are expected to be used by, the first beam 1102 or the second beam 1104 within the time window 1302. The UE 104 may then divide the total number of sub-channels that have been used by, or are expected to be used by, the first beam 1102 or the second beam 1104 within the time window 1302 by a total number of sub-channels in the resource pool 1300 within the time window 1302. Accordingly, based on the example shown in FIG. 13, the CR metric for the first beam 1102 may be:

$$CR = \frac{17 + .25(16)}{76} = \sim .28,$$

assuming a compensation factor (e.g., α) of 0.25.

In some cases, the CR metric for the second beam 1104 may also be determined using Equation 7 except that the first number of sub-channels in Equation 7 would correspond to the 16 sub-channels associated with the second beam 1104 and the second number of sub-channels in Equation 7 would correspond to the 17 sub-channels associated with the first beam 1102. Accordingly, for example, in view of the example shown in FIG. 13 and again assuming a compensation factor of 0.25, the CR metric for the second beam 1104 may be:

$$CR = \frac{16 + .25(17)}{76} = \sim .27$$

Additionally, with respect to the third beam 1106, because the angular separation 1110 in FIG. 11 between the third beam 1106 and the first beam 1102 (as well as the second beam 1104) is greater than a threshold, the UE 104 may only need to take into account the sub-channels that have been, or are expected to be, used by the third beam 1106 within the time window 1302 in FIG. 13 when determining the CR metric for the third beam 1106. In other words, when determining the CR metric for the third beam 1106, the UE 104 may not need to take into account any of the sub-channels that have been, or are expected to be used by, the first beam 1102 or the second beam 1104. As such, the CR metric for the third beam 1106 may be determined according to Equation 8, below.

$$CR = \frac{\text{\# of sub-channels used by third beam}}{\text{total number of sub-channels in resource pool}} \quad (8)$$

As can be seen in Equation 8, the CR metric for the third beam 1106 may be determined by dividing the number of sub-channels that have been used by, or are expected to be used by, the third beam 1106 within the time window 1302 (e.g., 12) by the total number of sub-channels in the resource pool 1300 within the time window 1302 (e.g., 76). Accordingly, based on the example shown in FIG. 13, the CR metric for the third beam 1106 may be:

$$CR = \frac{12}{76} = \sim .16.$$

Aspects Related to the Use of the Channel Ratio Metrics for Transmission

As noted above, the CBR and CR metrics may be used when transmitting signaling on a particular beam, such as the first beam 1102 in FIG. 11. For example, the CBR metric may be used to determine one or more transmission parameters. The one or more transmission parameters may include, for example, a modulation and coding scheme (MCS) for signaling transmitted on the first beam 1102, a number of sub-channels to use for the signaling transmitted on the first beam 1102, and a transmission bandwidth for the signaling transmitted on the first beam 1102. Additionally, as noted above, the CBR metric may be used to determine a CR limit. The CR limit is a maximum CR for the first beam 1102 that a UE 104 should not exceed when transmitting signaling via the first beam 1102. In other words, the CR limit may indicate a maximum number of sub-channels that the UE 104 may use for transmissions (e.g., on the first beam 1102) within a resource pool and a period of time.

In some cases, the UE 104 may employ the CR limit in combination with a determined CR metric when transmitting signaling via the first beam 1102, such as at 1016 in FIG. 10. For example, in some cases, the UE 104 may determine that the CR metric determined at 1014 in FIG. 10 is greater than the CR limit. In such cases, when the determined CR metric is greater than the CR limit, the UE 104 may need to take action to ensure that signaling transmitted by the UE 104 via the first beam 1102 does not exceed the CR limit associated with the first beam 1102. For example, in some cases, in response to detecting the determined CR metric is greater than the CR limit, the UE 104 may reduce, at least one of, a first number of sub-channels that are expected to be used for the transmissions using the first beam 1102 or a second number of sub-channels that are expected to be used for the transmissions using the one or more neighboring beams, such as the second beam 1104. Reducing the number of sub-channels that are expected to be used for transmissions using the first beam 1102 or the second beam 1104 may reduce the CR metric, helping to reduce that chances that signaling transmitted by the UE 104 (e.g., at 1016 in FIG. 10) exceeds the CR limit.

Figure 14:
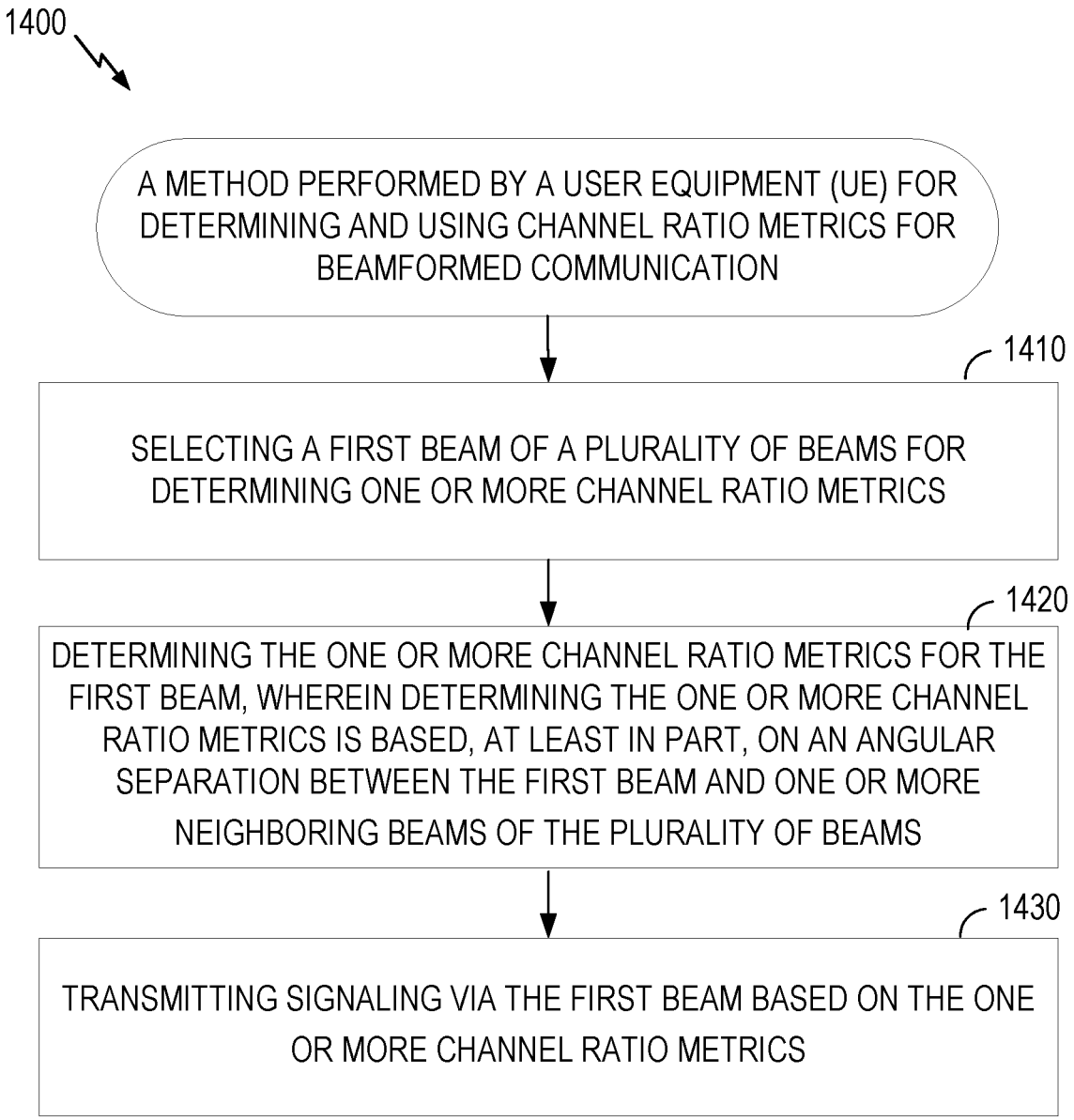
FIG. 14 is a flow diagram illustrating example operations for wireless communication by a user equipment.

Example Method for Determining and Using Channel Ratio Metrics for Beamformed Communication FIG. 14 is a flow diagram illustrating example operations 1400 for wireless communication, in accordance with certain aspects of the present disclosure. The operations 1400 may be performed, for example, by a UE (e.g., such as the UE 104 in the wireless communication network 100 of FIG. 1) for determining and using channel ratio metrics for beamformed communication. The operations 1400 may be implemented as software components that are executed and run on one or more processors (e.g., controller/processor 280 of FIG. 2). Further, the transmission and reception of signals by the UE in operations 1400 may be enabled, for example, by one or more antennas (e.g., antennas 252 of FIG. 2). In certain aspects, the transmission and/or reception of signals by the UE may be implemented via a bus interface of one or more processors (e.g., controller/processor 280, including the communication component 281) obtaining and/or outputting signals.

The operations 1400 begin at 1410 with selecting a first beam of a plurality of beams for determining one or more channel ratio metrics.

At block 1420, the UE determines the one or more channel ratio metrics for the first beam, wherein determining the one or more channel ratio metrics is based, at least in part, on an angular separation between the first beam and one or more neighboring beams of the plurality of beams.

At block 1430, the UE transmits signaling via the first beam based on the one or more channel ratio metrics.

In some cases, the operations 1400 further include, when then angular separation between the first beam and the one or more neighboring beams is greater than or equal to a threshold, performing one or more first measurements associated with the first beam.

In some cases, determining the one or more channel ratio metrics for the first beam in block 1420 is based on the one or more first measurements associated with the first beam and is not based on measurements associated with the one or more neighboring beams.

In some cases, the operations 1400 further include, when the angular separation between the first beam and the one or more neighboring beams is less than a threshold, performing: one or more first measurements associated with the first beam and one or more second measurements associated with the one or more neighboring beams. In such cases, determining the one or more channel ratio metrics for the first beam in block 1420 is based on the one or more first measurements associated with the first beam and the one or more measurements associated with the one or more neighboring beams.

In some cases, the one or more channel ratio metrics comprise a channel busy ratio (CBR) metric for the first beam. In some cases, the CBR metric is defined as a number sub-channels associated with the first beam within a resource pool that have a received signal strength indicator (RSSI) exceeding an RSSI threshold sensed within a CBR window.

In some cases, performing the one or more first measurements associated with the first beam comprises performing received signal strength indicator (RSSI) measurements for a first plurality of sub-channels in a resource pool. Additionally, in some cases, performing the one or more second measurements associated with the one or more neighboring beams comprises performing RSSI measurements for a second plurality of sub-channels in the resource pool. In some cases, the first plurality of sub-channels and second plurality of sub-channels do not overlap in the resource pool.

In some cases, the operations 1400 further include determining, based on the RSSI measurements for the first plurality of sub-channels, a first number of sub-channels associated with the first beam with RSSI measurements greater than a first RSSI threshold. In some cases, the operations 1400 further include determining, based on the RSSI measurements for the second plurality of sub-channels, a second number of sub-channels associated with the one or more neighboring beams with RSSI measurements greater than a second RSSI threshold.

In some cases, the first RSSI threshold and the second RSSI threshold comprise a same RSSI threshold. In such cases, determining the CBR metric for the first beam comprises: applying a compensation factor to the second number of sub-channels to generate a compensated second number of sub-channels, adding the first number of sub-channels to the compensated second number of sub-channels to generate a total number of sub-channels with RSSI measurements greater than the same RSSI threshold, and dividing the total number of sub-channels with RSSI measurements greater than the same RSSI threshold by a total number of sub-channels in the first plurality of sub-channels and the second plurality of sub-channels.

In some cases, the first RSSI threshold and the second RSSI threshold are different. For example, in some cases, the second RSSI threshold is greater than the first RSSI threshold. In such cases, determining the CBR metric for the first beam comprises: adding the first number of sub-channels to the second number of sub-channels to generate a total number of sub-channels with RSSI measurements greater than at least one of the first RSSI threshold or the second RSSI threshold and dividing the total number of sub-channels with RSSI measurements greater than at least one of the first RSSI threshold or the second RSSI threshold by a total number of sub-channels in the first plurality of sub-channels and the second plurality of sub-channels.

In some cases, the one or more channel ratio metrics comprise a channel occupancy ratio (CR) metric for the first beam. In some cases, the CR metric is defined as a number sub-channels associated with the first beam within a resource pool that have been used or that are expected to be used for transmissions using the first beam in a period of time.

In some cases, performing the one or more first measurements associated with the first beam comprises determining, from a resource pool, a first number of sub-channels, associated with the first beam, that have been used or are expected to be used for transmissions using the first beam within a period of time. Additionally, in some cases, performing the one or more second measurements associated with the one or more neighboring beams comprises determining, from the resource pool, a second number of sub-channels, associated with the one or more neighboring beams, that have been used or are expected to be used for transmissions using the one or more neighboring beams within the period of time.

In some cases, determining the CR metric for the first beam comprises: applying a compensation factor to the second number of sub-channels to generate a compensated second number of sub-channels, adding the first number of sub-channels to the compensated second number of sub-channels to generate a total number of sub-channels that have been used by, or are expected to be used by, the first beam or the one or more neighboring beams within the period of time, and dividing the total number of sub-channels that have been used by, or are expected to be used by, the first beam or the one or more neighboring beams within the period of time by a total number of sub-channels in the resource pool within the period of time.

In some cases, in addition to the CR metric, the one or more channel ratio metrics further comprise a CBR metric for the first beam. In such cases, the operations 1400 further include determining, based on the CBR metric, a CR limit associated with the UE, indicating a maximum number of sub-channels that the UE may use for transmissions within the resource pool and the period of time. Additionally, in some cases, operations 1400 further include determining that the CR metric is greater than the CR limit and reducing, at least one of, the first number of sub-channels that are expected to be used for the transmissions using the first beam or the second number of sub-channels that are expected to be used for the transmissions using the one or more neighboring beams.

In some cases, operations 1400 further include determining one or more transmission parameters based on the one or more channel ratio metrics, wherein the one or more transmission parameters include at least one of a modulation and coding scheme associated with the first beam, a bandwidth associated with the first beam, or a channel occupancy ratio (CR) limit associated with the UE. In some cases, transmitting the signaling via the first beam in block 1430 is further based on the one or more transmission parameters.

Example Wireless Communication Devices

Figure 15:
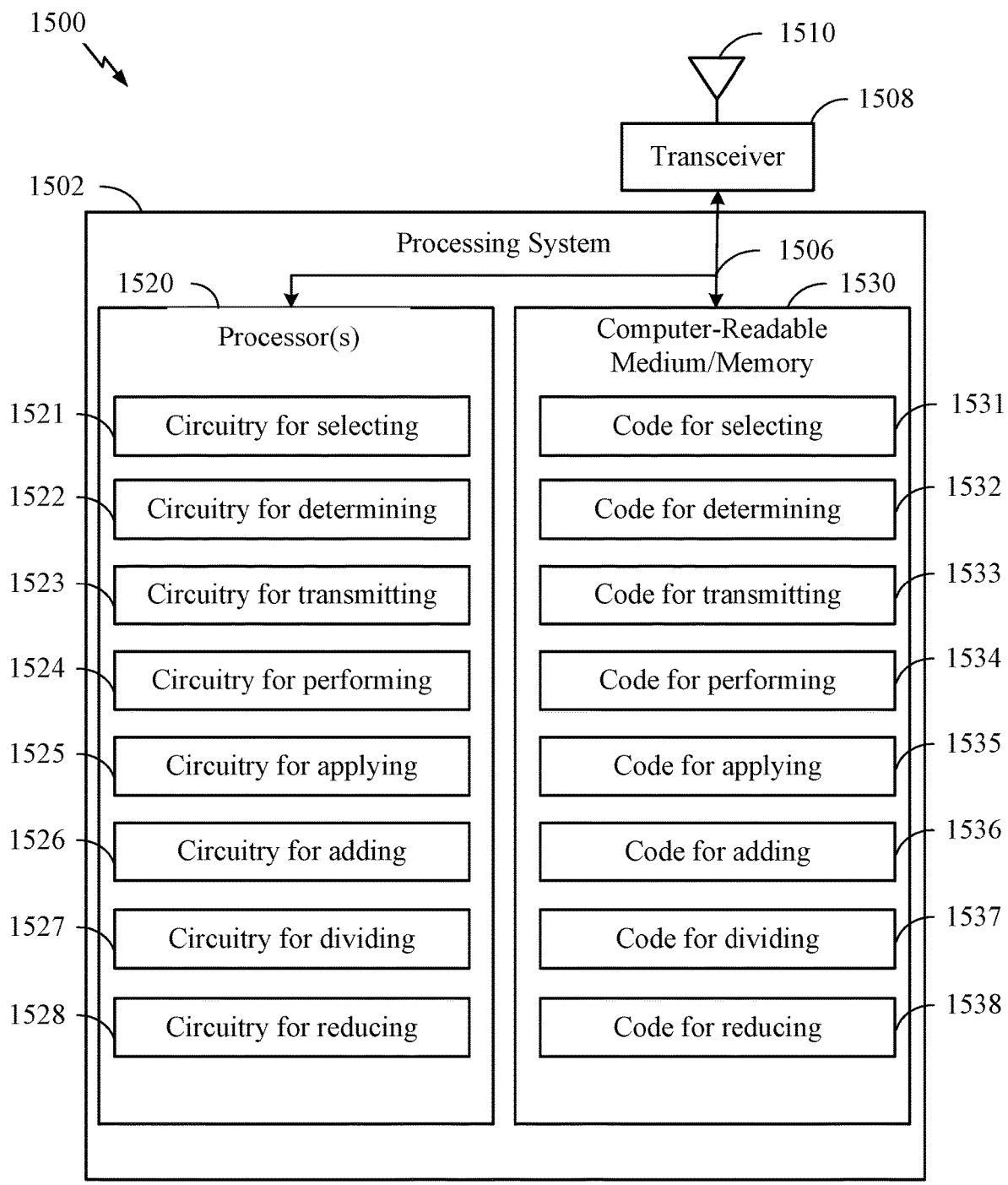
FIG. 15 depicts aspects of an example communications device.

FIG. 15 depicts an example communications device 1500 that includes various components operable, configured, or adapted to perform operations for the techniques disclosed herein, such as the operations depicted and described with respect to FIGS. 10 and 14. In some examples, communication device 1500 may be a user equipment 104 as described, for example with respect to FIGS. 1 and 2.

Communications device 1500 includes a processing system 1502 coupled to a transceiver 1508 (e.g., a transmitter and/or a receiver). Transceiver 1508 is configured to transmit (or send) and receive signals for the communications device 1500 via an antenna 1510, such as the various signals as described herein. Processing system 1502 may be configured to perform processing functions for communications device 1500, including processing signals received and/or to be transmitted by communications device 1500.

Processing system 1502 includes one or more processors 1520 coupled to a computer-readable medium/memory 1530 via a bus 1506. In certain aspects, computer-readable medium/memory 1530 is configured to store instructions (e.g., computer-executable code) that when executed by the one or more processors 1520, cause the one or more processors 1520 to perform the operations illustrated in FIGS. 10 and 14, or other operations for performing the various techniques discussed herein for determining and using channel ratio metrics for beamformed communication.

In the depicted example, computer-readable medium/memory 1530 stores code 1531 for selecting, code 1532 for determining, code 1533 for transmitting, code 1534 for performing, code 1535 for applying, code 1536 for adding, code 1537 for dividing, and code 1538 for reducing.

In the depicted example, the one or more processors 1520 include circuitry configured to implement the code stored in the computer-readable medium/memory 1530, including circuitry 1521 for selecting, circuitry 1522 for determining, circuitry 1523 for transmitting, circuitry 1524 for performing, circuitry 1525 for applying, circuitry 1526 for adding, circuitry 1527 for dividing, and circuitry 1528 for reducing.

Various components of communications device 1500 may provide means for performing the methods described herein, including with respect to FIGS. 10 and 14.

In some examples, means for transmitting or sending (or means for outputting for transmission) may include the transceivers 254 and/or antenna(s) 252 of the user equipment 104 illustrated in FIG. 2 and/or transceiver 1508 and antenna 1510 of the communication device 1500 in FIG. 15.

In some examples, means for receiving (or means for obtaining) may include the transceivers 254 and/or antenna(s) 252 of the user equipment 104 illustrated in FIG. 2 and/or transceiver 1508 and antenna 1510 of the communication device 1500 in FIG. 15.

In some examples, means for selecting, means for determining, means for performing, means for applying, means for adding, means for dividing, and means for reducing may include various processing system components, such as: the one or more processors 1520 in FIG. 15, or aspects of the user equipment 104 depicted in FIG. 2, including receive processor 258, transmit processor 264, TX MIMO processor 266, and/or controller/processor 280 (including communication component 281).

Notably, FIG. 15 is just one example, and many other examples and configurations of communication device 1500 are possible.

Example Clauses

Implementation examples are described in the following numbered clauses:

Clause 1: A method for wireless communication by a user equipment, comprising: selecting a first beam of a plurality of beams for determining one or more channel ratio metrics; determining the one or more channel ratio metrics for the first beam, wherein determining the one or more channel ratio metrics is based, at least in part, on an angular separation between the first beam and one or more neighboring beams of the plurality of beams; and transmitting signaling via the first beam based on the one or more channel ratio metrics.

Clause 2: The method of Clause 1, further comprising, when then angular separation between the first beam and the one or more neighboring beams is greater than or equal to a threshold, performing one or more first measurements associated with the first beam.

Clause 3: The method of Clause 2, wherein determining the one or more channel ratio metrics for the first beam is based on the one or more first measurements associated with the first beam and is not based on measurements associated with the one or more neighboring beams.

Clause 4: The method of any one of Clauses 1-3, further comprising, when the angular separation between the first beam and the one or more neighboring beams is less than a threshold, performing: one or more first measurements associated with the first beam; and one or more second measurements associated with the one or more neighboring beams.

Clause 5: The method of Clause 4, wherein determining the one or more channel ratio metrics for the first beam is based on the one or more first measurements associated with the first beam and the one or more second measurements associated with the one or more neighboring beams.

Clause 6: The method of Clause 5, wherein the one or more channel ratio metrics comprise a channel busy ratio (CBR) metric for the first beam.

Clause 7: The method of Clause 6, wherein the CBR metric is defined as a number sub-channels associated with the first beam within a resource pool that have a received signal strength indicator (RSSI) exceeding an RSSI threshold sensed within a CBR window.

Clause 8: The method of any one of Clauses 6-7, wherein: performing the one or more first measurements associated with the first beam comprises performing received signal strength indicator (RSSI) measurements for a first plurality of sub-channels in a resource pool, and performing the one or more second measurements associated with the one or more neighboring beams comprises performing RSSI measurements for a second plurality of sub-channels in the resource pool.

Clause 9: The method of Clause 8, wherein the first plurality of sub-channels and second plurality of sub-channels do not overlap in the resource pool.

Clause 10: The method of any one of Clauses 8-9, further comprising: determining, based on the RSSI measurements for the first plurality of sub-channels, a first number of sub-channels associated with the first beam with RSSI measurements greater than a first RSSI threshold; and determining, based on the RSSI measurements for the second plurality of sub-channels, a second number of sub-channels associated with the one or more neighboring beams with RSSI measurements greater than a second RSSI threshold.

Clause 11: The method of Clause 10, wherein the first RSSI threshold and the second RSSI threshold comprise a same RSSI threshold.

Clause 12: The method of Clause 11, wherein determining the CBR metric for the first beam comprises: applying a compensation factor to the second number of sub-channels to generate a compensated second number of sub-channels, adding the first number of sub-channels to the compensated second number of sub-channels to generate a total number of sub-channels with RSSI measurements greater than the same RSSI threshold, and dividing the total number of sub-channels with RSSI measurements greater than the same RSSI threshold by a total number of sub-channels in the first plurality of sub-channels and the second plurality of sub-channels.

Clause 13: The method of Clause 10, wherein the first RSSI threshold and the second RSSI threshold are different.

Clause 14: The method of Clause 13, wherein the second RSSI threshold is greater than the first RSSI threshold.

Clause 15: The method of Clause 13, wherein determining the CBR metric for the first beam comprises: adding the first number of sub-channels to the second number of sub-channels to generate a total number of sub-channels with RSSI measurements greater than at least one of the first RSSI threshold or the second RSSI threshold, and dividing the total number of sub-channels with RSSI measurements greater than at least one of the first RSSI threshold or the second RSSI threshold by a total number of sub-channels in the first plurality of sub-channels and the second plurality of sub-channels.

Clause 16: The method of any one of Clauses 5-15, wherein the one or more channel ratio metrics comprise a channel occupancy ratio (CR) metric for the first beam.

Clause 17: The method of Clause 16, wherein the CR metric is defined as a number sub-channels associated with the first beam within a resource pool that have been used or that are expected to be used for transmissions using the first beam in a period of time.

Clause 18: The method of any one of Clauses 16-17, wherein: performing the one or more first measurements associated with the first beam comprises determining, from a resource pool, a first number of sub-channels, associated with the first beam, that have been used or are expected to be used for transmissions using the first beam within a period of time, and performing the one or more second measurements associated with the one or more neighboring beams comprises determining, from the resource pool, a second number of sub-channels, associated with the one or more neighboring beams, that have been used or are expected to be used for transmissions using the one or more neighboring beams within the period of time.

Clause 19: The method of claim 18, wherein determining the CR metric for the first beam comprises: applying a compensation factor to the second number of sub-channels to generate a compensated second number of sub-channels, adding the first number of sub-channels to the compensated second number of sub-channels to generate a total number of sub-channels that have been used by, or are expected to be used by, the first beam or the one or more neighboring beams within the period of time, and dividing the total number of sub-channels that have been used by, or are expected to be used by, the first beam or the one or more neighboring beams within the period of time by a total number of sub-channels in the resource pool within the period of time.

Clause 20: The method of any one of Clauses 18-19, wherein the one or more channel ratio metrics further comprise a channel busy ratio (CBR) metric for the first beam.

Clause 21: The method of Clause 20, further comprising determining, based on the CBR metric, a CR limit associated with the UE, indicating a maximum number of sub-channels that the UE may use for transmissions within the resource pool and the period of time.

Clause 22: The method of Clause 21, further comprising: determining that the CR metric is greater than the CR limit; and reducing, at least one of, the first number of sub-channels that are expected to be used for the transmissions using the first beam or the second number of sub-channels that are expected to be used for the transmissions using the one or more neighboring beams.

Clause 23: The method of any one of Clauses 1-22, further comprising determining one or more transmission parameters based on the one or more channel ratio metrics, wherein the one or more transmission parameters include at least one of a modulation and coding scheme associated with the first beam, a bandwidth associated with the first beam, or a channel occupancy ratio (CR) limit associated with the UE.

Clause 24: The method of Clause 23, wherein transmitting the signaling via the first beam is further based on the one or more transmission parameters.

Clause 25: An apparatus, comprising: a memory comprising executable instructions; and one or more processors configured to execute the executable instructions and cause the apparatus to perform a method in accordance with any one of Clauses 1-24.

Clause 26: An apparatus, comprising means for performing a method in accordance with any one of Clauses 1-24.

Clause 27: A non-transitory computer-readable medium comprising executable instructions that, when executed by one or more processors of an apparatus, cause the apparatus to perform a method in accordance with any one of Clauses 1-24.

Clause 28: A computer program product embodied on a computer-readable storage medium comprising code for performing a method in accordance with any one of Clauses 1-24.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs, such as UE 104 and UE 103, may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of determining and using channel ratio metrics for beamformed communication in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication by a user equipment (UE), comprising:
   selecting a first beam of a plurality of beams for determining one or more channel ratio metrics;
   determining the one or more channel ratio metrics for the first beam, wherein determining the one or more channel ratio metrics is based, at least in part, on an angular separation between the first beam and one or more neighboring beams of the plurality of beams, wherein the one or more channel ratio metrics comprise at least one of a channel busy ratio (CBR) metric for the first beam or a channel occupancy ratio (CR) metric for the first beam; and
   transmitting signaling via the first beam based on the one or more channel ratio metrics.

2. The method of claim 1, further comprising, when the angular separation between the first beam and the one or more neighboring beams is greater than or equal to a threshold, performing one or more first measurements associated with the first beam.

3. The method of claim 2, wherein determining the one or more channel ratio metrics for the first beam is based on the one or more first measurements associated with the first beam and is not based on measurements associated with the one or more neighboring beams.

4. The method of claim 1, further comprising, when the angular separation between the first beam and the one or more neighboring beams is less than a threshold, performing:
   one or more first measurements associated with the first beam; and
   one or more second measurements associated with the one or more neighboring beams.

5. The method of claim 4, wherein determining the one or more channel ratio metrics for the first beam is based on the one or more first measurements associated with the first beam and the one or more second measurements associated with the one or more neighboring beams.

6. The method of claim 5, wherein the one or more channel ratio metrics comprise the CBR metric for the first beam.

7. The method of claim 6, wherein the CBR metric is defined as a number sub-channels associated with the first beam within a resource pool that have a received signal strength indicator (RSSI) exceeding an RSSI threshold sensed within a CBR window.

8. The method of claim 6, wherein:
   performing the one or more first measurements associated with the first beam comprises performing received signal strength indicator (RSSI) measurements for a first plurality of sub-channels in a resource pool, and
   performing the one or more second measurements associated with the one or more neighboring beams comprises performing RSSI measurements for a second plurality of sub-channels in the resource pool.

9. The method of claim 8, wherein the first plurality of sub-channels and second plurality of sub-channels do not overlap in the resource pool.

10. The method of claim 8, further comprising:
    determining, based on the RSSI measurements for the first plurality of sub-channels, a first number of sub-channels associated with the first beam with RSSI measurements greater than a first RSSI threshold; and
    determining, based on the RSSI measurements for the second plurality of sub-channels, a second number of sub-channels associated with the one or more neighboring beams with RSSI measurements greater than a second RSSI threshold.

11. The method of claim 10, wherein the first RSSI threshold and the second RSSI threshold comprise a same RSSI threshold.

12. The method of claim 11, wherein determining the CBR metric for the first beam comprises:
    applying a compensation factor to the second number of sub-channels to generate a compensated second number of sub-channels,
    adding the first number of sub-channels to the compensated second number of sub-channels to generate a total number of sub-channels with RSSI measurements greater than the same RSSI threshold, and
    dividing the total number of sub-channels with RSSI measurements greater than the same RSSI threshold by a total number of sub-channels in the first plurality of sub-channels and the second plurality of sub-channels.

13. The method of claim 10, wherein the first RSSI threshold and the second RSSI threshold are different.

14. The method of claim 13, wherein the second RSSI threshold is greater than the first RSSI threshold.

15. The method of claim 13, wherein determining the CBR metric for the first beam comprises:
    adding the first number of sub-channels to the second number of sub-channels to generate a total number of sub-channels with RSSI measurements greater than at least one of the first RSSI threshold or the second RSSI threshold, and dividing the total number of sub-channels with RSSI measurements greater than at least one of the first RSSI threshold or the second RSSI threshold by a total number of sub-channels in the first plurality of sub-channels and the second plurality of sub-channels.

16. The method of claim 5, wherein the one or more channel ratio metrics comprise the CR metric for the first beam.

17. The method of claim 16, wherein the CR metric is defined as a number sub-channels associated with the first beam within a resource pool that have been used or that are expected to be used for transmissions using the first beam in a period of time.

18. The method of claim 16, wherein:

performing the one or more first measurements associated with the first beam comprises determining, from a resource pool, a first number of sub-channels, associated with the first beam, that have been used or are expected to be used for transmissions using the first beam within a period of time, and performing the one or more second measurements associated with the one or more neighboring beams comprises determining, from the resource pool, a second number of sub-channels, associated with the one or more neighboring beams, that have been used or are expected to be used for transmissions using the one or more neighboring beams within the period of time.

19. The method of claim 18, wherein determining the CR metric for the first beam comprises:

applying a compensation factor to the second number of sub-channels to generate a compensated second number of sub-channels, adding the first number of sub-channels to the compensated second number of sub-channels to generate a total number of sub-channels that have been used by, or are expected to be used by, the first beam or the one or more neighboring beams within the period of time, and dividing the total number of sub-channels that have been used by, or are expected to be used by, the first beam or the one or more neighboring beams within the period of time by a total number of sub-channels in the resource pool within the period of time.

20. The method of claim 18, wherein the one or more channel ratio metrics further comprise a channel busy ratio (CBR) metric for the first beam.

21. The method of claim 20, further comprising determining, based on the CBR metric, a CR limit associated with the UE, indicating a maximum number of sub-channels that the UE may use for transmissions within the resource pool and the period of time.

22. The method of claim 21, further comprising:

determining that the CR metric is greater than the CR limit; and reducing, at least one of, the first number of sub-channels that are expected to be used for the transmissions using the first beam or the second number of sub-channels that are expected to be used for the transmissions using the one or more neighboring beams.

23. The method of claim 1, further comprising determining one or more transmission parameters based on the one or more channel ratio metrics, wherein the one or more transmission parameters include at least one of a modulation and coding scheme associated with the first beam, a bandwidth associated with the first beam, or a channel occupancy ratio (CR) limit associated with the UE.

24. The method of claim 23, wherein transmitting the signaling via the first beam is further based on the one or more transmission parameters.

25. An apparatus for wireless communication by a user equipment (UE), comprising:

one or more processors individually or collectively configured to execute instructions stored on one or more memories and to cause the UE to:

select a first beam of a plurality of beams for determining one or more channel ratio metrics;

determine the one or more channel ratio metrics for the first beam, wherein determining the one or more channel ratio metrics is based, at least in part, on an angular separation between the first beam and one or more neighboring beams of the plurality of beams, wherein the one or more channel ratio metrics comprise at least one of a channel busy ratio (CBR) metric for the first beam or a channel occupancy ratio (CR) metric for the first beam; and transmit signaling via the first beam based on the one or more channel ratio metrics.

26. The apparatus of claim 25, wherein the one or more processors are further configured to cause the UE to, when the angular separation between the first beam and the one or more neighboring beams is less than a threshold, perform:

one or more first measurements associated with the first beam; and one or more second measurements associated with the one or more neighboring beams, wherein the one or more processors are further configured to cause the apparatus to determine the one or more channel ratio metrics for the first beam based on the one or more first measurements associated with the first beam and the one or more second measurements associated with the one or more neighboring beams.

27. The apparatus of claim 26, wherein:

the one or more channel ratio metrics comprise the CBR metric for the first beam, and the CBR metric is defined as a number sub-channels associated with the first beam within a resource pool that have a received signal strength indicator (RSSI) exceeding an RSSI threshold sensed within a CBR window.

28. The apparatus of claim 26, wherein:

the one or more channel ratio metrics comprise the CR metric for the first beam, and the CR metric is defined as a number sub-channels associated with the first beam within a resource pool that have been used or that are expected to be used for transmissions using the first beam in a period of time.

29. An apparatus for wireless communication, comprising:

means for selecting a first beam of a plurality of beams for determining one or more channel ratio metrics;

means for determining the one or more channel ratio metrics for the first beam, wherein determining the one or more channel ratio metrics is based, at least in part, on an angular separation between the first beam and one or more neighboring beams of the plurality of beams, wherein the one or more channel ratio metrics comprise at least one of a channel busy ratio (CBR) metric for the first beam or a channel occupancy ratio (CR) metric for the first beam; and means for transmitting signaling via the first beam based on the one or more channel ratio metrics.

30. A non-transitory computer-readable medium for wireless communication, comprising:
executable instructions that, when executed by one or more processors of an apparatus, cause the apparatus to
select a first beam of a plurality of beams for determining one or more channel ratio metrics;
determine the one or more channel ratio metrics for the first beam, wherein determining the one or more channel ratio metrics is based, at least in part, on an angular separation between the first beam and one or more neighboring beams of the plurality of beams, wherein the one or more channel ratio metrics comprise at least one of a channel busy ratio (CBR) metric for the first beam or a channel occupancy ratio (CR) metric for the first beam; and
transmit signaling via the first beam based on the one or more channel ratio metrics.

\* \* \* \* \*